US005347294A

United States Patent [19]

Usui et al.

[11] Patent Number: 5,347,294

[45] Date of Patent: Sep. 13, 1994

[54] IMAGE DISPLAY APPARATUS

[75] Inventors: Minoru Usui, Akishima; Kouji Yamagishi, Oome; Ken Yoshino, Koganei; Hideki Mori, Tokyo, all of Japan

[73] Assignee: Casio Computer Co., Ltd., Tokyo, Japan

[21] Appl. No.: 866,744

[22] Filed: Apr. 10, 1992

[30] Foreign Application Priority Data

| | | | |
|---|---|---|---|
| Apr. 17, 1991 | [JP] | Japan | 3-110831 |
| Jun. 12, 1991 | [JP] | Japan | 3-140269 |
| Sep. 13, 1991 | [JP] | Japan | 3-263188 |
| Sep. 26, 1991 | [JP] | Japan | 3-276597 |

[51] Int. Cl.[5] .......................... G09G 3/36; H04N 9/12

[52] U.S. Cl. ....................................... 345/89; 348/790

[58] Field of Search ................ 340/793, 784; 358/236; 345/89, 147, 148; 348/790

[56] References Cited

U.S. PATENT DOCUMENTS

| | | | |
|---|---|---|---|
| 4,769,713 | 9/1988 | Yasui | 340/793 |
| 5,075,683 | 12/1991 | Ghis . | |
| 5,089,812 | 2/1992 | Fuse et al. | 340/793 |

FOREIGN PATENT DOCUMENTS

| | | |
|---|---|---|
| 0193728 | 9/1986 | European Pat. Off. . |
| 0261900 | 3/1988 | European Pat. Off. . |
| 0319291 | 6/1989 | European Pat. Off. . |
| 0349415 | 1/1990 | European Pat. Off. . |
| 2-113476 | 9/1990 | Japan . |
| 2-113477 | 9/1990 | Japan . |

*Primary Examiner*—Jeffery Brier

*Attorney, Agent, or Firm*—Frishauf, Holtz, Goodman & Woodward

[57] ABSTRACT

An image display circuit supplies gray scale data according to a video signal to a liquid crystal panel to present a gray-scaled display, and scans the liquid crystal panel N times during one field period of a video signal. The image display circuit includes a table ROM comparing a current video signal with a previous video signal of one frame before, and generates gray scale data for N times in accordance with the comparison result. Gray scale data greater than the gray scale of the current video signal is generated when the comparison result indicates that the gray scale of the current video signal is greater than that of the previous video signal, and gray scale data smaller than the gray scale of the current video signal is generated when the gray scale of the current video signal is found to be smaller than that of the previous video signal. Based on the generated gray scale data, the liquid crystal panel is driven with the proper gray scales.

12 Claims, 19 Drawing Sheets

ROM TABLE 100

| CURRENT TIME / PREVIOUS TIME | 0 | 1 | 2 | 3 | ...... | 15 | ...... | 31 |
|---|---|---|---|---|---|---|---|---|
| 0 | 0000 | 2000 | 3010 | 4110 | | 7777 | | 7777 |
| 1 | 0000 | 1000 | 2010 | 3110 | | 7777 | | 7777 |
| 2 | 0000 | 0000 | 1010 | 2110 | | 7777 | | 7777 |
| 3 | 0000 | 0000 | 0010 | 1110 | | 7777 | | 7777 |
| ... | | | | | | | | |
| 15 | 0000 | 0000 | 0000 | 0000 | | 4443 | | 7777 |
| ... | | | | | | | | |
| 31 | 0003 | 0000 | 0000 | 0000 | | 0000 | | 7777 |

FIG. 9

| φf | SCAN ELECTRODE DRIVE SIGNAL Xn | | | SIGNAL ELECTRODE DRIVE SIGNAL Yn | | |
|---|---|---|---|---|---|---|
| | SELECTED STATE | NON-SELECTED STATE | ZERO BIAS EC"H" | SELECTED STATE | NON-SELECTED STATE | ZERO BIAS EC"H" |
| POSITIVE | $V_0$ | $V_2$ | $V_2$ | $V_3$ | $V_1$ | $V_2$ |
| INVERTED | $V_4$ | $V_2$ | $V_2$ | $V_1$ | $V_3$ | $V_2$ |

FIG.11

LOWER ADDRESSES

UPPER ADDRESSES

| | | | A2 | 0 | 0 | 0 | 0 | 1 | 1 | 1 | 1 |
|---|---|---|---|---|---|---|---|---|---|---|---|
| | | | A1 | 0 | 0 | 1 | 1 | 0 | 0 | 1 | 1 |
| | | | A0 | 0 | 1 | 0 | 1 | 0 | 1 | 0 | 1 |
| A5 | A4 | A3 | | | | | | | | | |
| 0 | 0 | 0 | | 0 | 2 | 4 | 5 | 6 | 7 | 7 | 7 |
| 0 | 0 | 1 | | 0 | 1 | 3 | 4 | 6 | 7 | 7 | 7 |
| 0 | 1 | 0 | | 0 | 0 | 2 | 4 | 5 | 7 | 7 | 7 |
| 0 | 1 | 1 | | 0 | 0 | 1 | 3 | 5 | 7 | 7 | 7 |
| 1 | 0 | 0 | | 0 | 0 | 1 | 2 | 4 | 6 | 7 | 7 |
| 1 | 0 | 1 | | 0 | 0 | 0 | 2 | 3 | 5 | 7 | 7 |
| 1 | 1 | 0 | | 0 | 0 | 0 | 1 | 2 | 4 | 6 | 7 |
| 1 | 1 | 1 | | 0 | 0 | 0 | 0 | 1 | 3 | 5 | 7 |

FIG.19

| FRAME | 0 | 1 | 2 | 3 | 4 | 5 | 6 | 7 | 8 | 9 |
|---|---|---|---|---|---|---|---|---|---|---|
| IMAGE DATA FROM A/D | 0 → | 4 → | 7 → | 5 → | 1 → | 3 → | 4 → | 0 → | 7 → | 6 |
| IMAGE DATA FROM ROM | * → | 6 → | 7 → | 3 → | 0 → | 4 → | 5 → | 0 → | 7 → | 5 |

FIG.20

| U-V | S1 | S0 | R |
|---|---|---|---|
| 4 OR GREATER | 1 | 0 | * |
| 1 ~ 3 | 0 | 1 | U-V |
| 0 | 0 | 0 | * |
| -3 ~ -1 | 0 | 1 | U-V |
| -4 OR LOWER | 1 | 1 | * |

0:LOW LEVEL
1:HIGH LEVEL
*:UNDETERMINED

FIG.22

| S1 | S0 | P OUTPUT |
|---|---|---|
| 0 | 0 | I |
| 0 | 1 | J |
| 1 | 0 | K |
| 1 | 1 | L |

FIG.23

CURRENT GRAY SCALE (A)

GRAY SCALE DIFFERENCE (B)

| 0 | 1 | 2 | 3 | 4 | 5 | 6 |
|---|---|---|---|---|---|---|
| +3 | | | 5 | 6 | 7 | 7 |
| +2 | | 3 | 5 | 6 | 7 | 7 |
| +1 | 1 | 2 | 5 | 6 | 6 | 7 |
| -1 | 0 | 1 | 2 | 3 | 4 | 5 |
| -2 | 0 | 1 | 1 | 2 | 3 | |
| -3 | 0 | 0 | 1 | 1 | | |

FIG. 24

IMAGE DISPLAY APPARATUS

BACKGROUND OF THE INVENTION

1. Field of the Invention

The present invention generally relates to an image display apparatus with a relatively large screen for use in a liquid crystal projector, a liquid crystal television, etc. More particularly, the present invention pertains to an image display apparatus using simple matrix liquid crystal display apparatus, such as an STN liquid crystal display apparatus.

2. Description of the Related Art

It is required that a liquid crystal display (LCD) apparatus for a television set should have high performance and good quality, such as high resolution, fine gray scales, quick response and high contrast.

There are two type LCD display apparatus: a simple matrix LCD apparatus and a TFT LCD apparatus. The TFT LCD apparatus is considered to be more excellent in the quality of an image and a response speed. The simple matrix type LCD apparatus has the following two shortcomings:

i) A response speed is low.

ii) Because of high duty, the margin is small and contrast is low.

Particularly, the response speed of the simple matrix LCD apparatus is low. If STN liquid crystal is used, the response speed will be lower even though the contrast is improved.

In a conventional LCD apparatus, since the quality of an image is determined by the number of bits constituting a control signal which defines an image, the circuit scale and the number of wirings have to be increased to acquire a high-quality display. In a liquid crystal driving circuit which displays an image on an LCD with gray scales by means of pulse width modulation, for example, if the number of bits of the control signal can be decreased, the number of wirings and the circuit scale will also be reduced, ensuring a lower cost for the apparatus accordingly. It is however, difficult to improve the quality of an image without reducing the number of bits.

SUMMARY OF THE INVENTION

It is therefore an object of the present invention to provide a liquid crystal display apparatus with a simple matrix structure, which can accomplish a high response speed and an image of high quality.

It is another object of the present invention to provide a liquid crystal display apparatus which can display an image of high quality with fewer bits of the control signal.

To achieve those objects, according to the present invention, there is provided an image display apparatus for supplying gray scale data according to a video signal to a liquid crystal panel to present a gray-scaled display, and for scanning the liquid crystal panel N times (N is an integer equal to or greater than 2) during one field period of a video signal, comprising:

gray scale data generating means for comparing a current video signal with a previous video signal of a predetermined period before, and generating gray scale data for N times in accordance with a comparison result; and drive means for driving the liquid crystal panel with proper gray scales based on the gray scale data generated by the gray scale generating means.

With the above arrangement, the liquid crystal display apparatus compares display data for the current screen with that for the immediately previous screen, generates gray scale data for N times in accordance with the comparison result, and presents a gray-scaled image based on the generated gray scale data. The response speed of liquid crystals can therefore be improved significantly. Even if, for example, STN type liquid crystals are used, the improvement of the response speed is possible without lowering contrast. The liquid crystal display apparatus according to this invention can therefore accomplish quick response and high image quality even with a simple matrix structure.

Since desirable gray scales can be acquired by N times displays, the response speed can be increased while reducing the number of transmitted bits.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 9 is a diagram showing the structure of a ROM table in the image display apparatus;

FIG. 11 shows voltage levels of scan and signal electrode drive signals in the image display apparatus;

FIG. 19 is a diagram showing an image data table to be stored in a ROM;

FIG. 20 is a diagram showing the status of image data which changes with the frame change;

FIG. 22 is a diagram showing the contents of an identification signal to be output from a comparator shown in FIG. 21;

FIG. 23 is a diagram showing the operation of a selector shown in FIG. 21; and

FIG. 24 is a diagram illustrating the correlation between an input data to an address decoder in FIG. 21 and image data to be read from the ROM.

DETAILED DESCRIPTION OF THE PREFERRED EMBODIMENTS

The first embodiment of the present invention will now be described referring to FIGS. 1 to 17.

An apparatus according to this embodiment is a liquid crystal projector, which separates light from a single light source into components of R (red), G (green) and B (blue), irradiates the components respectively to three liquid display modules, and combines images displayed on the individual liquid display modules, projecting the resultant image on a screen.

Figure 1:
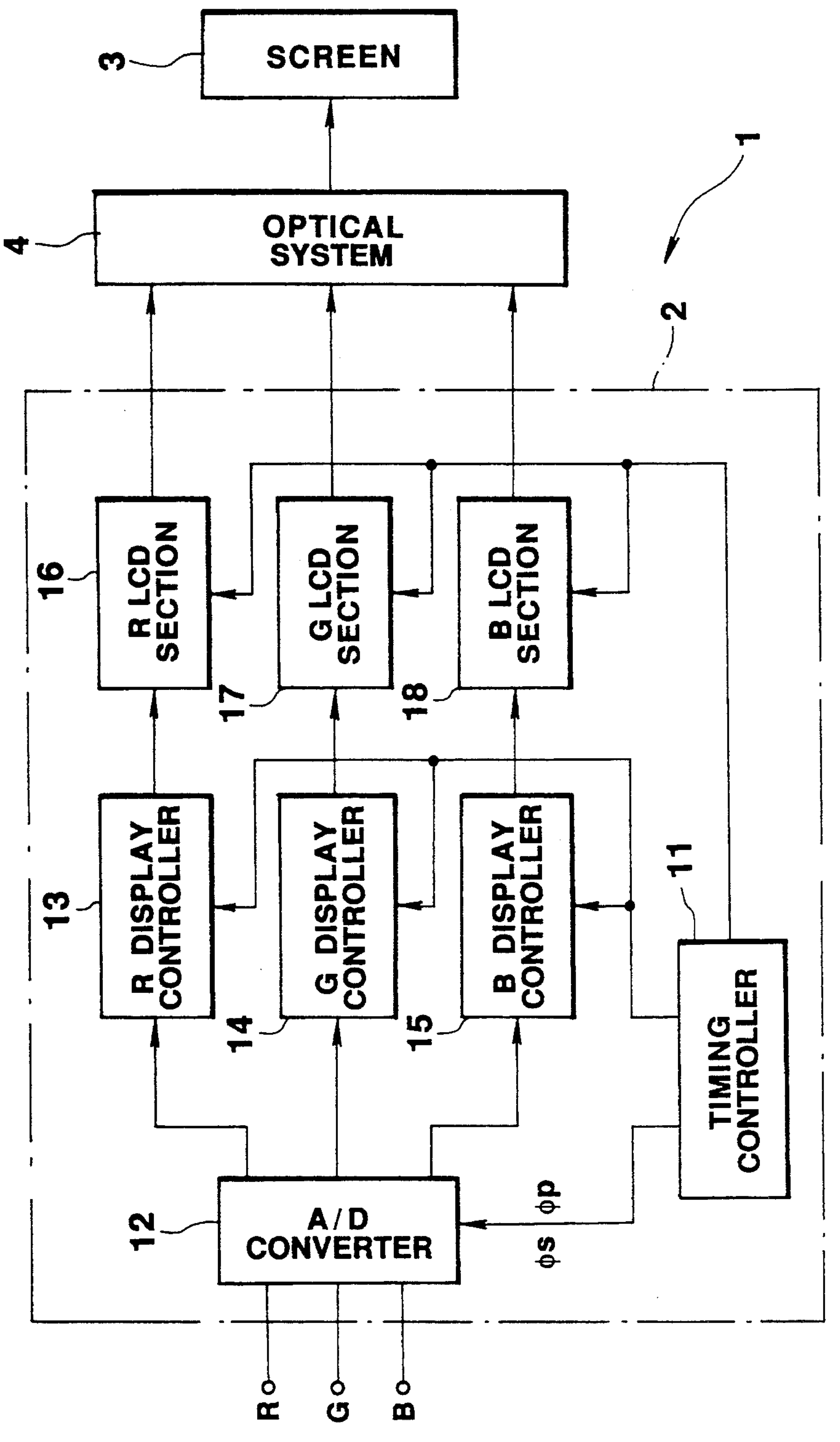
FIG. 1 is a diagram illustrating the entire structure of a liquid crystal projector according to the first embodiment of the present invention.

FIG. 1 illustrates the entire structure of a liquid crystal projector 1. In FIG. 1, the liquid crystal projector 1 comprises an image display device 2 and an optical system 4. The image display device 2 displays video signals for three colors R, G and B on the respective three liquid crystal panels. The optical system 4 combines images displayed on the R, G and B liquid crystal panels by reflection and/or transmittance of the light from a light source, and projects the enlarged composed image on a screen 3 by a projection lens.

The image display device 2 comprises a timing controller 11, an A/D converter 12, an R display controller 13, a G display controller 14, a B display controller 15, an R liquid crystal display (LCD) section 16, a G LCD section 17, and a B LCD section 18. The timing controller 11 generates various timing signals and supplies the signals to the individual circuits. The A/D converter 12 converts a video signal from a video signal source into a digital signal comprising predetermined bits (e.g., five bits) based on a sampling clock $\phi_S$. The R, G and B display controllers 13, 14 and 15 control the display on the R, G and B liquid crystal panels in accordance with a control signal from the timing controller 11. The R, G and B LCD sections 16, 17 and 18 drive the R, G and B liquid crystal panels in response to the outputs of the R, G and B display controllers 13, 14 and 15. The detailed explanation of the image display apparatus 2 will be given later referring to FIG. 9.

Figure 2:
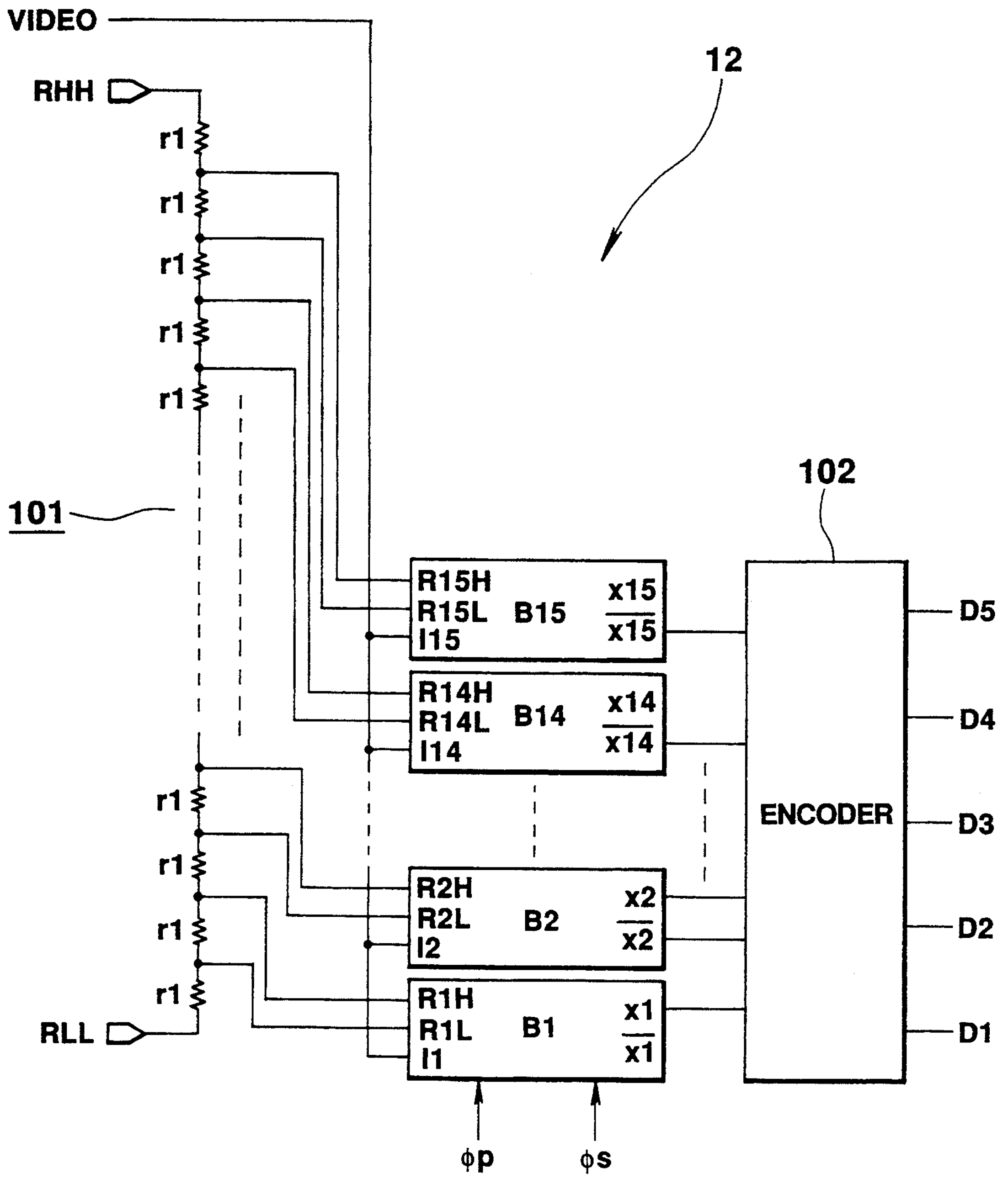
FIG. 2 is a block diagram showing the structure of an A/D converter in an image display apparatus shown in FIG. 1.
Figures 17A, 17B, 17C, 17D, 17E:
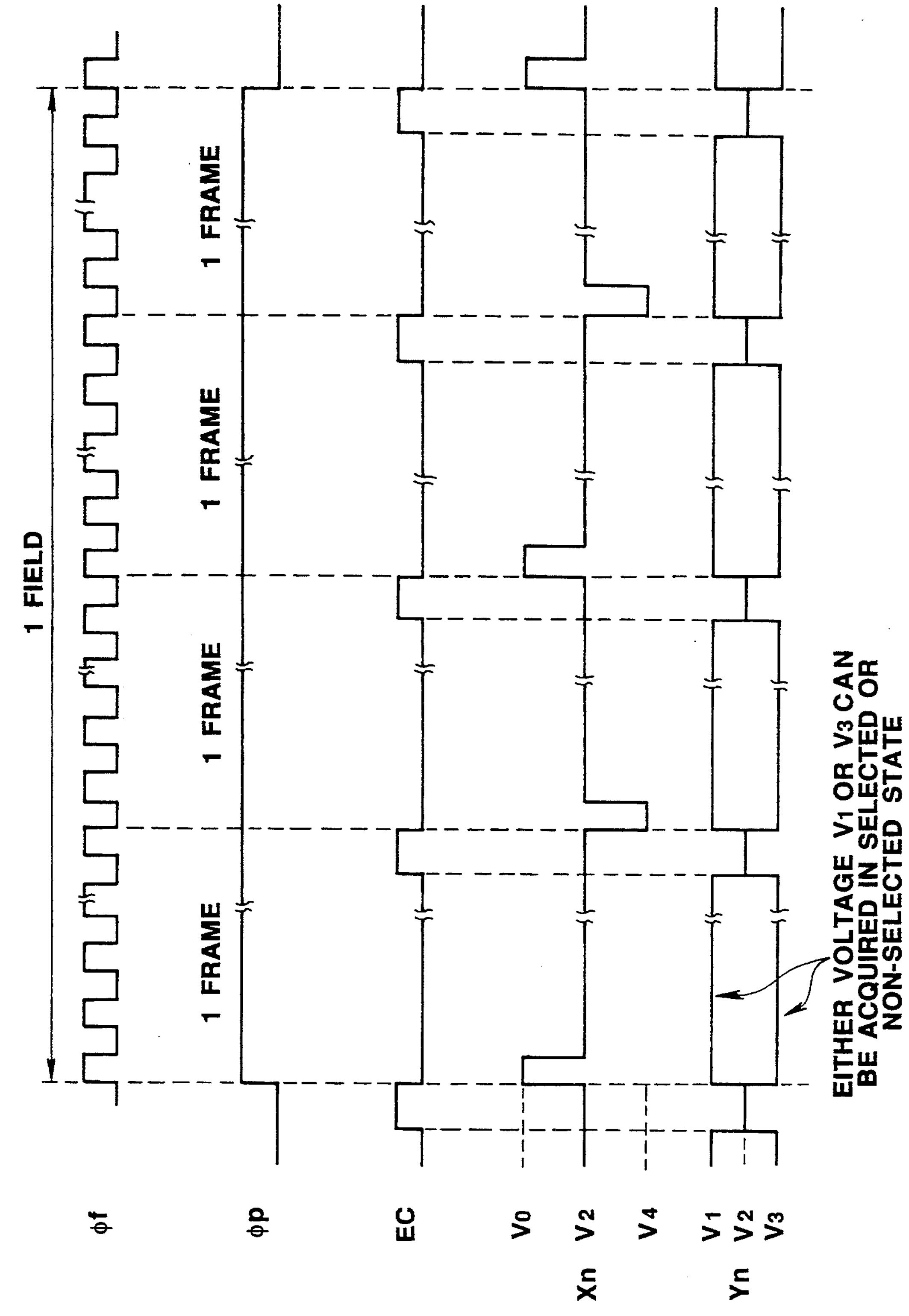
FIGS. 17A to 17E are waveforms for explaining the operation of the liquid crystal display apparatus.

FIG. 2 is a block diagram showing the structure of the A/D converting section for the color B in the A/D converter 12. A/D converting sections for colors R and G have the substantially same structure as the A/D converting section for color B. In FIG. 2, a reference voltage generator 101 includes 31 series-connected resistors $r_1$ between source voltages RHH and RLL, which have the same resistances, acquiring 30 different reference voltages at connection points thereof. The reference voltages output from the reference voltage generator 101 are sent respectively to reference voltage terminals R1L to R15L and R1H to R15H in comparators B1 to B15. Supplied to each of the comparators B1 to B15 are a sampling clock $\phi_S$ and a select signal $\phi_p$ for selecting a reference voltage for every field (FIG. 17B). A video signal received from a video amplifier (not shown) at the preceding stage is sent to data input terminals I1 to I15 of the comparators B1 to B15.

In response to the select signal $\phi_p$, the comparators B1 to B15 alternatively select the first or second reference voltage, and compare the video signal with the selected reference voltage, outputting the comparison result to an encoder 102 in response to the sampling clock $\phi_S$. The encoder 102 encodes outputs X1 to X15 of the respective comparators B1 to B15, and sends the encoded data as 5-bit image data D1 to D5 to the display controllers 13, 14 and 15.

As described above, in the comparators B1 to B15, the compared reference voltages are switched for every field, and the input video signals even at the same level are occasionally converted into different data. The data output from the comparators B1 to B15 are encoded by the encoder 102, yielding 5-bit data D1 to DS, which are in turn sent to the display controllers 13, 14 and 15. If the video signals at the same level are input to the comparators B1 to B15, therefore, the data D1 to D5 may have different values for an odd field and even field.

Figure 3:
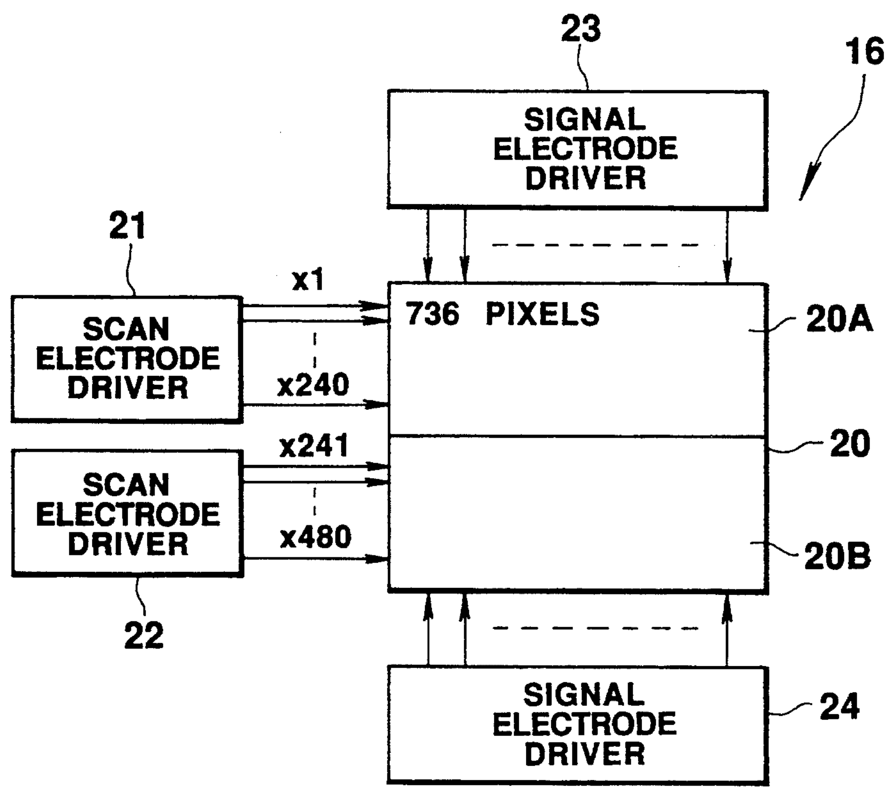
FIG. 3 is a block diagram of a liquid crystal display apparatus in the image display apparatus.

FIG. 3 presents a block diagram of the LCD sections 16, 17 and 18, but shows only the R LCD section 16 as a representative because those three systems for R, G and B are constituted of the same circuit. As shown in FIG. 3, the R LCD section 16 includes: a liquid crystal panel 20 bisected into upper and lower portions 20A and 20B; a scan driver 21 for driving scan electrodes of the upper liquid crystal panel 20A; a scan driver 22 for driving scan electrodes of the lower liquid crystal panel 20B; and signal drivers 23 and 24 for driving signal electrodes in response to the output of the R display controller 13.

The scan drivers 21 and 22 apply scan signals to the scan electrodes of the upper and lower liquid crystal panels 20A and 20B, respectively. The signal drivers 23 and 24 apply video signals to the signal electrodes of the liquid crystal panels 20A and 20B to thereby control the gray scales (gradation) of liquid crystal pixels where the scan electrodes cross the signal electrodes.

The gray scale data from the R display controller 13 is subjected to pulse width modulation (PWM) by the signal drivers 23 and 24. More specifically, signals with one of 16 pulse widths corresponding to the gray scale data are prepared by the signal drivers 23 and 24, and are then supplied to the associated signal electrodes to thereby determine the contrast of the display pixels on the selected scan electrodes.

The above-described operation will be repeated every time the selected scan electrodes are changed.

The technical features of this embodiment will now be summarized briefly.

(1) Set the frame frequency larger than the normal one.

In an image display apparatus, the period for scanning the entire one screen is called "one frame" and its cycle (frame frequency) is 60 Hz in general because one screen is displayed in one field of a video signal. The image display apparatus 2 of the embodiment scans the liquid crystal panel 20 four times in 1/60 second, and displays an image four times in the conventional one frame period (1/60 second). The frame frequency is therefore 240 Hz in this embodiment. To accomplish this four-time-display, in this embodiment, the display controllers 13, 14 and 15 are each provided with frame memories (RAM-A, RAM-B, RAM-C and RAM-D) so that data temporarily stored in the memory is read out four times at given timings during one conventional frame period. It is to be noted that two fields of a video signal are also called "frame" and the term "frame" in this specification is used to mean one scanning of the liquid crystal panel as well as two fields of a video signal.

(2) Use bisected liquid crystal panels.

As shown in FIG. 3, the liquid crystal panel is bisected into the upper and lower liquid crystal panels 20A and 20B. The scan drivers 21 and 22 are provided to respectively drive the upper liquid crystal panel 20A and the lower liquid crystal panel 20B so as to select the scan electrodes of the liquid crystal panel 20A and those of the liquid crystal panel 20B. This manipulation can reduce the duty to a half, doubling the select time for one scanning. To simultaneously select the scan electrodes of the upper and lower liquid crystal panels 20A and 20B, data of the scan electrode X1 and data of the scan electrode X241, for example, should be obtained at the same time, thus requiring that at least one of the data be read out from a memory. According to this embodiment, this memory comprises the aforementioned RAM-A, RAM-B, RAM-C and RAM-D.

(3) Convert the values of gray scale signals using a ROM table in order to increase the response speed of the liquid crystal panel.

Figure 4:
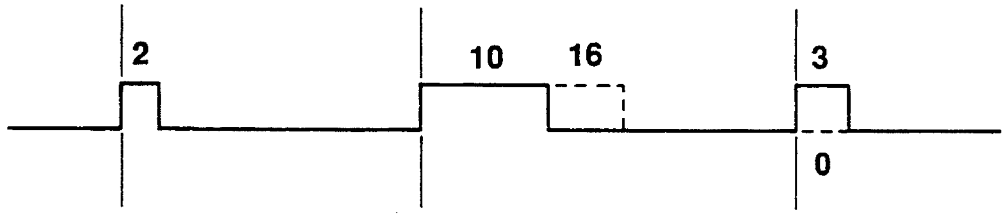
FIG. 4 is a waveform for explaining the conversion of a gray scale (gradation) signal in the image display apparatus.
Figure 5:
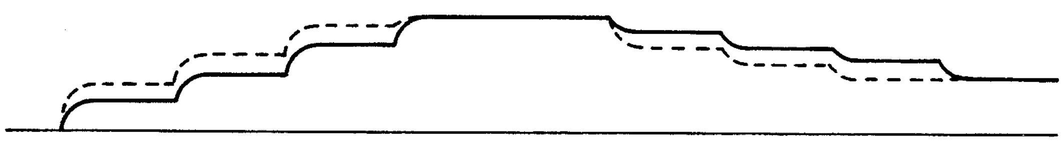
FIG. 5 is a waveform for explaining the response speed of the image display apparatus.

In the case where the gray scale signal of a certain pixel on the liquid crystal panel 20 is "2" in one frame and becomes "10" in the next frame as shown in FIG. 4, the response speed of the liquid crystal is low so that the gray scale of that pixel is gently changed from "2" to "10." This delays the gray scale of that pixel to reach "10" as indicated by the solid line in FIG. 5.

According to this embodiment, therefore, the original gray scale signal indicating the gray scale "10" is converted to a gray scale signal that represents the gray scale "16," for example, shown with a broken line in FIG. 4 to thereby improve the response speed. Likewise, when the gray scale signal of a certain pixel is "10" in one frame and becomes "3" in the next frame, the original gray scale signal "3" is converted to a gray scale signal "0" to improve the response speed of the liquid crystal shown with a broken line in FIG. 4.

To effect the above conversion of gray scale signals, a ROM is provided with a ROM table having the gray scale values of the previous frame and those of the current frame in association with each other, so that the conversion of gray scale signals is executed referring to the ROM table to speed up the conversion. For instance, with the value of the previous frame being "0" and the value of the current frame being "0," the table data is set to "0," while when the value of the previous frame is "2" and the value of the current frame is "10," the table data is set to "15." In this manner the display data (gray scale signal) of a video signal is not given directly to the liquid crystal panel, but is modified using the ROM table before being supplied to the liquid crystal panel.

In the case where the gray scale of the current frame is "10" and the gray scale of "15" is given after conversion by the ROM table, when the gray scale of the next frame is "10," the gray scale of the previous frame is "10" and that of the current frame is "10." As a result, data "10," for example, would be read out from the ROM table.

Assuming that it is sufficient to simply increase the response speed, then, the follow-up to gray scale data of the gray scale actually displayed can be enhanced by giving the maximum value of a gray scale signal when the value of the current gray scale signal is larger than the previous value and giving the minimum value when the current value is smaller than the previous one. In this case, however, an overshoot or undershoot would occur. Actually, therefore, the optimal values need to be acquired through simulation or the like and stored in the ROM table in advance. As the optimal values vary with temperature, a plurality of ROM tables may be provided in association with different temperatures.

(4) Alter the number of bits of a gray scale signal.

When a gray scale signal acquired by the A/D converter 12 is a 5-bit parallel signal, normally, the peripheral circuits would process the 5-bit parallel signal. For the LCD sections 16, 17 and 18, it is desirable that the number of required wirings be reduced. According to this embodiment, therefore, the 5-bit gray scale signal acquired by the A/D converter 12 is converted into a 3-bit signal using the following method, reducing the number of wirings.

When the gray scale signal acquired by the A/D converter 12 indicates a gray scale of "5," for example, a single signal (pulse) with a width corresponding to the gray scale "5" is supplied to a signal electrode in one field period (1/60 second) according to the prior art. On the contrary, this embodiment divides one field period (1/60 second) into four frame periods (1/240 second) as explained above in the section describing feature (1). A drive signal is supplied to a signal electrode in each frame to set the sum of the pulse-width of the four drive signals to be applied to the liquid crystal during one field period to a value corresponding to the gray scale "5." As the operation of the liquid crystal depends on the effective value of the applied voltage, this technique does not cause the value of the signals to be applied to the liquid crystal during one field to differ from the one acquired in the prior art, making it possible to provide the desired gray scale. Accordingly, the value of individual signals to be applied to the signal electrodes can be reduced to about $\frac{1}{4}$ of the conventional value and the number of bits of a gray scale signal can be reduced to three bits from five bits.

The above concept will be described specifically referring to FIGS. 6A to 6G, wherein the gray scale signals for only one of the pixels is shown. The solid lines in FIGS. 6A to 6G represent waveforms of a conventional gray scale signal (frame frequency of 60 Hz), and the broken lines represent the waveforms of a gray scale signal according to the present invention (frame frequency of 240 Hz).

Figures 6A, 6B, 6C, 6D, 6E, 6F, 6G:
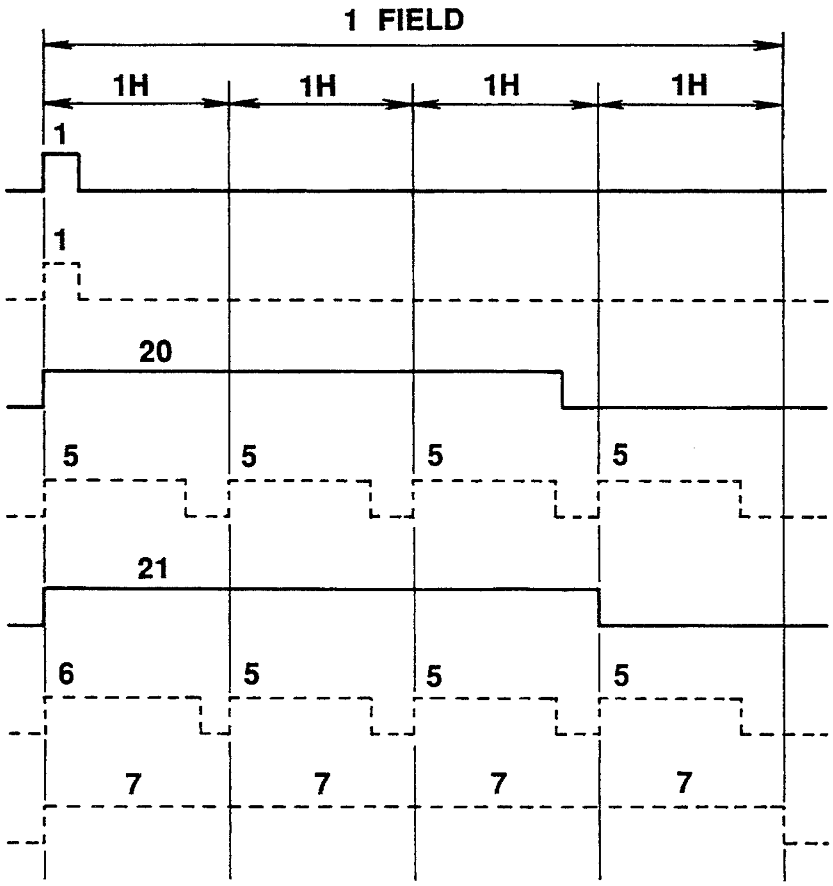
FIGS. 6A to 6G are waveforms for explaining the gray scale signals of the image display apparatus.

When the gray scale to be displayed is "1," a pulse having a pulse width corresponding to the gray scale "1" is supplied to the signal electrodes as shown in FIG. 6A according to the prior art. According to this embodiment, a pulse having a pulse width corresponding to the gray scale "1" is supplied to the signal electrodes in one frame (1/240 sec), and no pulse is supplied in the other three frames as shown in FIG. 6B.

When the gray scale to be displayed is "20," a pulse having a pulse width corresponding to the gray scale "20" is supplied to the signal electrodes as shown in FIG. 6C according to the prior art. According to this embodiment, however, a pulse having a pulse width corresponding to the gray scale "5" is supplied to the signal electrodes in each frame as shown in FIG. 6D. The total of the pulse widths of the pulses to be applied to the signal electrodes during one field becomes a value corresponding to the gray scale "20."

When the gray scale to be displayed is "21," a pulse having a pulse width corresponding to the gray scale "21" is supplied to the signal electrodes as shown in FIG. 6E according to the prior art. According to this embodiment, on the contrary, a pulse having a pulse width corresponding to the gray scale "6" is supplied to the signal electrodes in one frame (1/240 sec) and a pulse having a pulse width corresponding to the gray scale "5" is supplied in the other three frames as shown in FIG. 6F. Consequently, the total of the pulse widths of the pulses to be applied to the signal electrodes during one field becomes a value corresponding to the gray scale "21."

When the gray scales to be displayed are anywhere from "28" to "31" (full), a pulse having a pulse width corresponding to the maximum gray scale "7" that can be expressed by three bits is supplied to the signal electrodes in each frame according to the present invention, as shown in FIG. 6G. That is, since a 3-bit gray scale signal is used in this embodiment, when the original display gray scale is between "28" and "31," a signal having the waveform shown in FIG. 6G is applied to the signal electrodes to present the gray scale of "28."

(5) Drive scan electrodes by twos.

Figure 7:
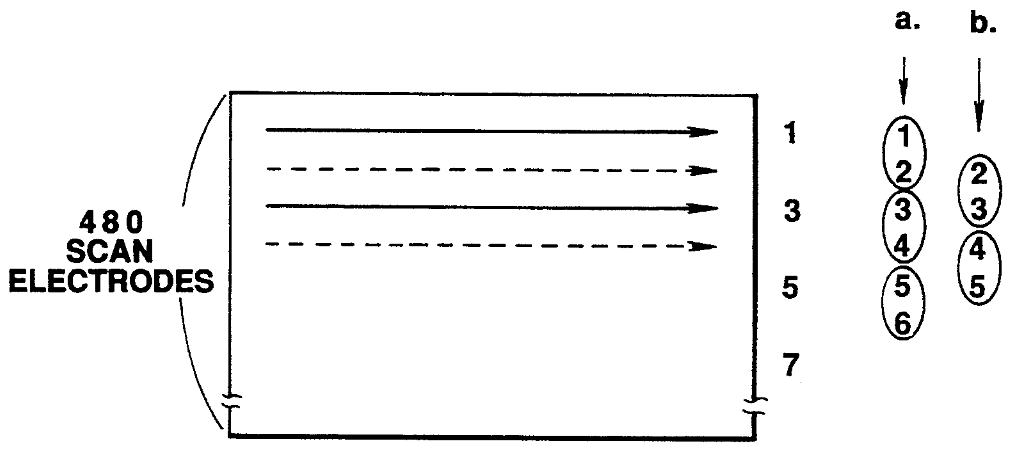
FIG. 7 is a diagram for explaining that scanning electrodes of the image display apparatus are driven in units of two electrodes.

Assuming that there are 480 scan electrodes in total as shown in FIG. 7, because of the bisected liquid crystal panel 20, 240 scan electrodes are driven in one frame period. In the case of a CRT, so-called interlaced scanning is performed so that odd numbered lines are scanned in one frame and even numbered lines are scanned in the next field. When the duty is high in the LCD apparatus, the operation margin (drive voltage ratio) drops undesirably. According to this embodiment, therefore, in one frame, a line 2 is scanned together with a line 1, and a line 4 is scanned together with a line 3. In the next field, the line combination is changed so that the line 3 is scanned together with the line 2, and a line 5 is scanned together with the line 4.

(6) Provide a zero bias period in each frame period.

A television signal has a vertical blanking period during which no display data is present. According to the conventional image display apparatus, the scan electrodes and signal electrodes are kept at the same potential (zero-biased) in the vertical blanking period. With the liquid crystal panel driven with a frame frequency of 240 Hz as in this embodiment, however, it was confirmed through experiments that the display would be adversely influenced if the zero bias periods concentrated in one frame.

According to this embodiment, the zero bias periods are distributed to the individual frames to avoid the concentration of those periods in one frame, preventing an adverse effect on the display. The zero bias periods are simply distributed to the individual frames, and are the same as those in the prior art so that the operational margin of the liquid crystal panel will not fall.

The zero bias periods are distributed in this embodiment utilizing the frame memories (RAM-A, RAM-B, RAM-C and RAM-D) which serve to increase the frame frequency by four times the conventional one.

If data display is effected using data read out from a frame memory, it is theoretically possible to display an image without a vertical blanking period. In other words, one field has only to be evenly divided into four during which the liquid crystal panel should be driven. In the prior art, one field is 262.5H (where H is the horizontal scan period), and equally dividing this period by four yields a fractional value of 65.625H. It is not practical to provide such a fractional timing. In this respect this embodiment drives the liquid crystal at a timing that is an integer multiple of 1H, and zero-biases the liquid crystal in the remaining period.

According to this embodiment, there are 480 scan lines as shown in FIG. 7, and the scan electrodes are simultaneously selected by twos for each of the upper liquid crystal panels 20A and 20B of the bisected liquid crystal panel 20. Since the select period per line is ½H, the display period for one image is $$120\times(\tfrac{1}{2})\times4=240\text{H}.$$

The period in one field period which is not used for data is $$262.5\text{H}-240\text{H}=22.5\text{H}.$$

Therefore, the zero bias period per frame is $$22.5\text{H}\div4=5.265\text{H}.$$

SPECIFIC EMBODIMENT

FIGS. 8 through 17 illustrate a specific embodiment of an image display apparatus having the features (1) to (6) explained above.

Figure 8:
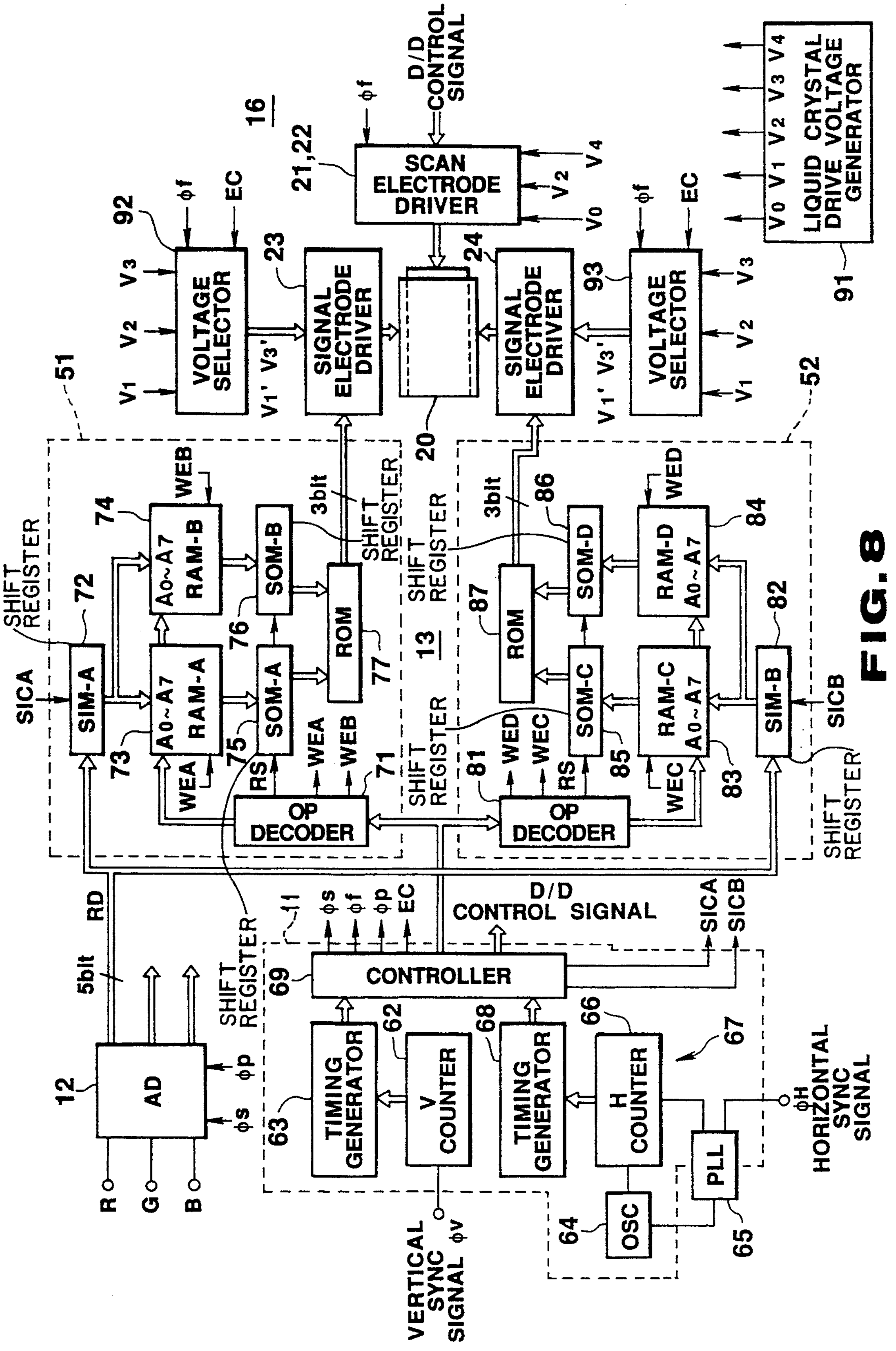
FIG. 8 is a specific block diagram illustrating the image display apparatus.

To begin with, the structure of this embodiment will be described. The image display apparatus 2 comprises three circuits for R (red), G (green) and B (blue), respectively, and those three circuits have substantially the same structure. FIG. 8 therefore illustrates the circuit for R as being representative.

The image display apparatus 2 comprises a timing controller 11 for generating various timing signals and producing a control signal based on the timing signals, display controllers 51 and 52 for executing display control in accordance with the control signal from the timing controller 11, signal drivers 23 and 24 for driving a liquid crystal panel 20 for gray-scaled display in response to the outputs of the display controllers 51 and 52, and scan drivers 21 and 22 for driving the liquid crystal panel based on a predetermined timing. The timing controller 11 and the display controller 51 process a 5-bit signal, while the signal drivers 23 and 24 and the scan drivers 21 and 22 process a 3-bit signal.

The timing controller 11 comprises: a V counter 62; a timing generator 63; a voltage controlled oscillator (OSC) 64; a PLL circuit 67 which includes a phase comparator 65 and an H counter 66; a timing generator 68; and a controller 69. The V counter 62 counts a vertical sync signal $\phi_V$. The timing generator 63 produces various vertical timing clocks based on the output of the V counter 62. The PLL circuit 67 compares the phase of a horizontal sync signal $\phi_H$ with that of a signal acquired by frequency-dividing the output of the OSC 64, and locks the phases. The timing generator 68 produces various horizontal timing clocks based on the output of the H counter 66 of the PLL circuit 67. The controller 69 produces various control signals based on the outputs of the timing generators 63 and 68. The controller 69 outputs a D/D control signal, and outputs a select signal $\phi_p$ that has levels "1" and "0" inverted for each single field to the A/D converter 12, an inversion signal $\phi_f$ that has levels "1" and "0" inverted for every 1H (H: horizontal scan period) to the scan drivers 21 and 22, and a zero bias control signal EC to voltage selectors 92 and 93 to set the zero bias.

The output of the A/D converter 12 is supplied to the display controller 51 which controls the upper liquid crystal panel 20A, and to the display controller 52 which controls the lower liquid crystal panel 20B. The D/D control signal prepared in the controller 69 is supplied to the display controllers 51 and 52. The display controller 51 has the same structure as the display controller 52, but has different operational timings for the internal circuitry from those of the latter controller 52.

The display controller 51 comprises an OP (operation) decoder 71, a shift register (SIM (Serial In Memory)-A) 72, a frame memory (RAM-A) 73, a frame memory (RAM-B) 74, a shift register (SOM (Serial Out Memory)-A) 75, a shift register (SOM-B) 76, and a ROM 77. The OP decoder 71 decodes an output signal from the timing controller 11 to output write enable signals WEA and WEB to enable data writing in the frame memory 73 and frame memory 74, and a read pulse RS. The shift register 72 holds 5-bit digital video data RD for R (red) after conversion for one scan line. The frame memory 73 sequentially stores the data RD for one scan line held in the shift register 72, in response to the write enable signal WEA. The frame memory 74 sequentially stores the data RD for 1H held in the shift register 72, in response to the write enable signal WEB. The shift register 75 reads out video data for one scan line from the frame memory 73 in response to the read pulse RS to convert it to serial data. The shift register 76 reads out video data for one scan line from the frame memory 74 in response to the read pulse RS to convert it to serial data. The ROM 77 includes a ROM table 100 as shown in FIG. 9, sequentially compares the video data of the previous frame with that of the current frame using the data stored in the shift registers 75 and 76 as addresses.

The display controller 52 comprises an OP decoder 81, a shift register (SIM-B) 82, a frame memory (RAM-C) 83, a frame memory (RAM-D) 84, a shift register (SOM-C) 85, a shift register (SOM-D) 86, and a ROM 87. The OP decoder 81 decodes the D/D control signal from the timing controller 11 to output write enable signals WEC and WED to enable data writing in the frame memory 83 and frame memory 84, and a read pulse RS. The shift register 82 holds 5-bit digital video data RD for R (red) after conversion for one scan line. The frame memory 83 sequentially stores the data RD for one scan line held in the shift register 82, in response to the write enable signal WEC. The frame memory 84 sequentially stores the data RD for one scan line held in the shift register 82, in response to the write enable signal WED. The shift register 75 reads out video data for one scan line from the frame memory 83 in response to the read pulse RS to convert it to serial data. The shift register 86 reads out video data for one scan line from the frame memory 84 in response to the read pulse RS to convert it to serial data. The ROM 87 including the ROM table 100 the data held in the ROM table 100 to the signal driver 56, sequentially compares the video data of the preceding frame with that of the current frame, using the data stored in the shift registers 85 and 86 as address data for the ROM 87.

Assuming that there are 736 pixels of the liquid crystal panel 20 per scan line, the shift registers (SIM-A) 72 and (SIM-B) 82 are each a 736-stage shift register. The data stored in the shift registers 72 and 82 are input to the frame memories (RAM-A) 73, (RAM-B) 74, (RAM-C) 83, and (RAM-D) 84. This operation will be described later.

The data read out from the ROM 77 is output to the signal driver 23, while the data read out from the ROM 87 is output to the signal driver 24. Based on the 3-bit data read from the ROMs 77 and 87, the signal electrode drivers 23 and 24 supply gray scale signals to the signal electrodes of panels 20A and 20B. (The number of bits of the gray scale signal in the display controllers 51 and 52 is 5 bits.)

The scan electrode driver 21 drives scan electrodes of the liquid crystal panel 20 at the timing shown in FIG. 15 which will be discussed later.

There are 736 pixels of the liquid crystal panel 20 per one scan line, and three such panels each with 480 scan electrodes are used for R, G and B. The number of pixels of an image to be projected in this case is $$\text{Number of pixels} = 480 \times 736 \times 3.$$

The amount of data to be processed by the display controllers is $$\text{Amount of data} = (\text{number of pixels}) \times 5 \text{ (bits)}.$$

The duty of the liquid crystal panel 20 is $$\begin{aligned} \text{Duty} &= 1/480 \times 2 \text{ (for bisected liquid crystal panel 20)} \times \\ &\quad 2 \text{ (for two lines of scan electrodes selected simultaneously)} \\ &= 1/120 \end{aligned}$$

FIG. 9 illustrates the structure of the ROM table 100 stored in each of the ROMs 77 and 82.

The ROM table 100 is a table prepared for conversion of the gray scale signals to improve the response speed of the liquid crystal and conversion of the number of bits of each gray scale signal as discussed in the earlier descriptions of features (3) and (4). The ROM table 100 has the following features.

The values (0 to 31) of a 5-bit gray scale signal in the previous frame of the video signal are assigned to the vertical addresses in the ROM table 100, and the values (0 to 31) of a 5-bit gray scale signal in the current frame of a video signal are assigned to the horizontal addresses. Data converted values are stored in the individual entries of the ROM table 100. Each data converted value includes four 3-bit gray scale data 0 (minimum value representable by three bits) to 7 (maximum value representable by three bits). The data converted values are a set of 3-bit gray scale data determined to improve the response speed of the liquid crystal as much as possible, based on the difference between the gray scale data of the previous frame (two fields before) of a video signal and that of the current frame of the video signal. The optimal data converted values are computed in advance through simulation or the like and stored in the ROM table 100.

The difference between the gray scale data of the previous frame of a video signal and that of the current frame of the video signal is considered here because the gray scale of on arbitrary pixel is specified for each frame (two fields).

For instance, when the value of 5-bit gray scale data of the previous frame of a video signal is "2" and the value of 5-bit gray scale data of the current frame of the video signal is "15," the ROM 77 compares "2" with "15" and reads out a converted value "7777" from the associated entry of the ROM table 100. Based on the value "7777," a signal corresponding to the gray scale "7" is applied to the signal electrodes in the first to fourth frames in one field. This is substantially equivalent to applying a gray scale signal, which specifies a gray scale of "28(=7×4)" in the current field to the signal electrodes, thus improving the response speed. As the gray scale signal read out from the ROM table 100 consists of three bits, the number of bits the signal driver 23 should process is reduced.

Likewise, when the value of 5-bit gray scale data of the previous frame of the video signal is "15" and the value of 5-bit gray scale data of the current frame of the video signal is "15," for example, a converted value "4443" is read out from the associated entry of the ROM table 100, and a signal corresponding to the gray scale "4" is applied to the signal electrodes in the first to third frames in one field and a signal corresponding to the gray scale "3" is applied to the signal electrodes in the fourth frame in the field.

Referring to FIG. 8, a liquid crystal drive voltage generator 91 generates liquid crystal drive voltages V0 to V4, the voltages V1 to V3 being supplied to voltage selectors 92 and 93, the voltages V0, V2 and V4 being supplied to the scan electrodes drivers 21 and 22. The drive voltages V0 to V4 are set with such given voltage differences that V0 and V1 are on the positive side with V2 in the center while V3 and V4 are on the negative side. The voltage selectors 92 and 93 are supplied with the zero bias control signal EC from the controller 69, while the scan electrode drivers 21 and 22 are supplied with the inversion signal $f. The inversion signal $\phi_f$ has its signal level inverted in synchronism with a common shift clock to select the voltage V0 or V4 for driving the scan electrodes. The zero bias control signal EC serves to distribute the zero bias periods to each of the frames as shown in FIG. 17. This zero bias control signal EC is normally at a "0" level and becomes "1" for a predetermined period before each frame end.

The scan electrode drivers 21 and 22, which are provided with shift registers to generate scan signals, shift the D/D control signal from the controller 69 in synchronism with the common shift clock to sequentially drive the scan electrodes of the liquid crystal panel 20 in accordance with data shifted in those shift registers.

Figure 10:
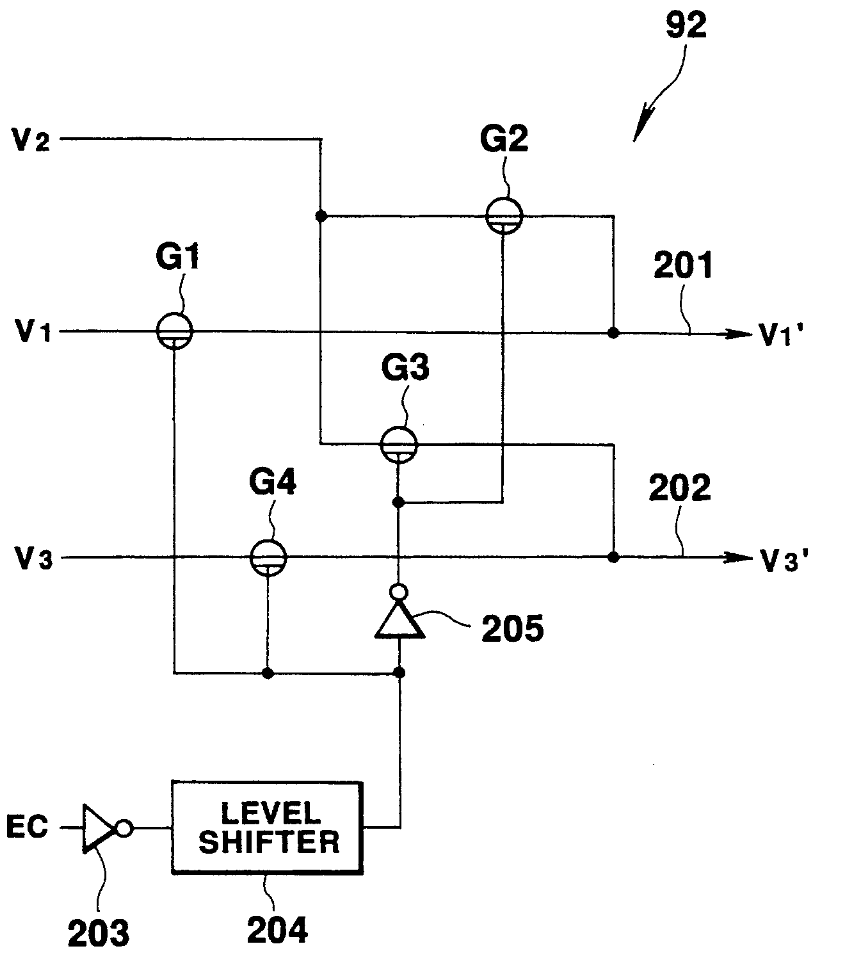
FIG. 10 is a diagram illustrating the structure of a voltage selector in the image display apparatus.

The voltage selectors 92 and 93 are as shown in FIG. 10. FIG. 10 illustrates the circuit configuration of the voltage selector 92. The voltage selector 93 has the same circuit structure. Referring to FIG. 10, the voltage selector 92 is supplied with the liquid crystal drive voltages V1, V2 and V3 from the drive voltage generator 91. The drive voltage V1 is output via a gate circuit G1 to an output line 201. The drive voltage V2 is output via a gate circuit G2 to the output line 201 and via a gate circuit G3 to an output line 202. The drive voltage V3 is output via a gate circuit G4 to the output line 202. The zero bias control signal EC coming from the controller 69 via an inverter 203 is level-shifted by a level shifter 204, and is then supplied as a gate signal to the gate circuits G1 and G4 as well as to the gate circuits G2 and G3 also as a gate signal via an inverter 205. The voltage taken from the output line 201 is sent as a liquid crystal drive voltage V1' to the signal driver 23, and the voltage taken from the output line 202 sent there as a liquid crystal drive voltage V3'. The output voltage of the signal electrode driver 23 is selected in accordance with the video data output from the display controller 51 to be sent as a signal electrode drive signal to the liquid crystal panel 20. In the zero bias periods of the individual frames, the zero bias control signal EC becomes a high level and the output of the inverter 205 also becomes a high level. This enables the gate circuits G2 and G3, and disables the gate circuits G1 and G4, permitting the voltage V2 to be output from both output lines 201 and 202. This voltage V2 gives a zero bias to the liquid crystal. In other periods than the zero bias periods, i.e., at the normal operation time, the zero bias control signal EC becomes low, and the output of the inverter 205 also becomes low. This disables the gate circuits G2 and G3, and enables the gate circuits G1 and G4, permitting the voltage V1 to be output from the output line 201 and the voltage V3 to be output from the output line 202. As a result, the signal driver 23 outputs the voltage V1 or V3 as the signal electrode drive voltage in accordance with the data from the display controller 51. In other words, the voltage selectors 92 and 93 output voltages as shown in FIG. 11 in accordance with the zero bias control signal EC and the inversion signal $\phi_f$.

The operation of a projection type image display apparatus according to this embodiment will be described below.

General Operation

To begin with, the PLL circuit 65 of the timing controller 11 locks the phase and frequency of the horizontal sync signal $\phi_H$ prepared from the video signal and those of a signal acquired by frequency-dividing the output of the OSC 64 by means of the H counter 66. The output of the H counter 66 is input to the timing generator 68, which in turn produces various timing clocks for horizontal sync control. The vertical sync signal $\phi_V$ is input to the v counter 62. Based on the count output of the H counter 66, the V counter 62 counts the horizontal sync signal in synchronism with the vertical sync signal $\phi_V$. The timing generator 63 prepares various timing clocks for vertical sync control.

The video signal for R (red) is output to the shift register (SIM-A) 72 and the shift register (SIM-B) 82 after being converted to a 5-bit digital signal by the A/D converter 12. The data RD for one horizontal scan of the converted digital video signal R (red) is stored in the shift register 72. Data of one frame stored in the shift register 72 is written as data for the A field and data for the B field in the frame memory (RAM-A) 73 in response to the write enable signal WEA (FIG. 13). Likewise, data of the next frame is written as data for the C field and data for the D field in the frame memory (RAM-B) 74 in response to the write enable signal WEB (FIG. 13). The video data for the same scan line stored in the frame memories 73 and 74 are read out into the respective shift registers (SOM-A) 75 and (SOM-B) 76 at a time in response to the read pulse RS (FIG. 13). With output data of the shift registers 75 and 76 used as the address in the RAM 77, the ROM 77 sequentially compares the data of the previous frame of the video signal with data of the current frame of the video signal concerning the same pixel, and reads out the associated contents of the ROM table 100. The read-out 3-bit data is sent to the signal electrode driver 23.

As the frame frequency of the present image display apparatus 2 is 240 Hz and two liquid crystal panels 20A and 20B are used, data for one line is read out from the ROM 77 in a ½ horizontal scan period, and is displayed on the liquid crystal panel 54 via the signal driver 23.

An image is displayed on the lower liquid crystal panel 20B in a similar manner. The same display control as done for the R will be performed for G display section and the B display section.

Operations of Display Controllers 51 and 52

The controller 69 sends a shift clock SICA to the shift register (SIM-A) 72 in the first half of each field, and sends a shift clock SICB to the shift register (SIM-B) 82 in the second half of each field. The shift clocks SICA and SICB are output at the timing the A/D converter 12 outputs gray scale data for one dot.

In the first half of each field, the shift register 72 latches the data from the A/D converter 12 while shifting it in response to the data shift clock SICA. When a gray scale signal for one scan electrode is held in the shift register 72, this held data is stored in the frame memory (RAM-A) 73 or (RAM-B) 74 for every two fields.

In the second half of each field, the shift register 82 latches the data from the A/D converter 12 while shifting it in response to the data shift clock SICB. When a gray scale signal for one scan electrode is held in the shift register 82, this held data is stored in the frame memory (RAM-C) 83 or (RAM-D) 84 for every two fields. This operation will now be described referring to FIGS. 12 and 13A–13J.

Figure 12:
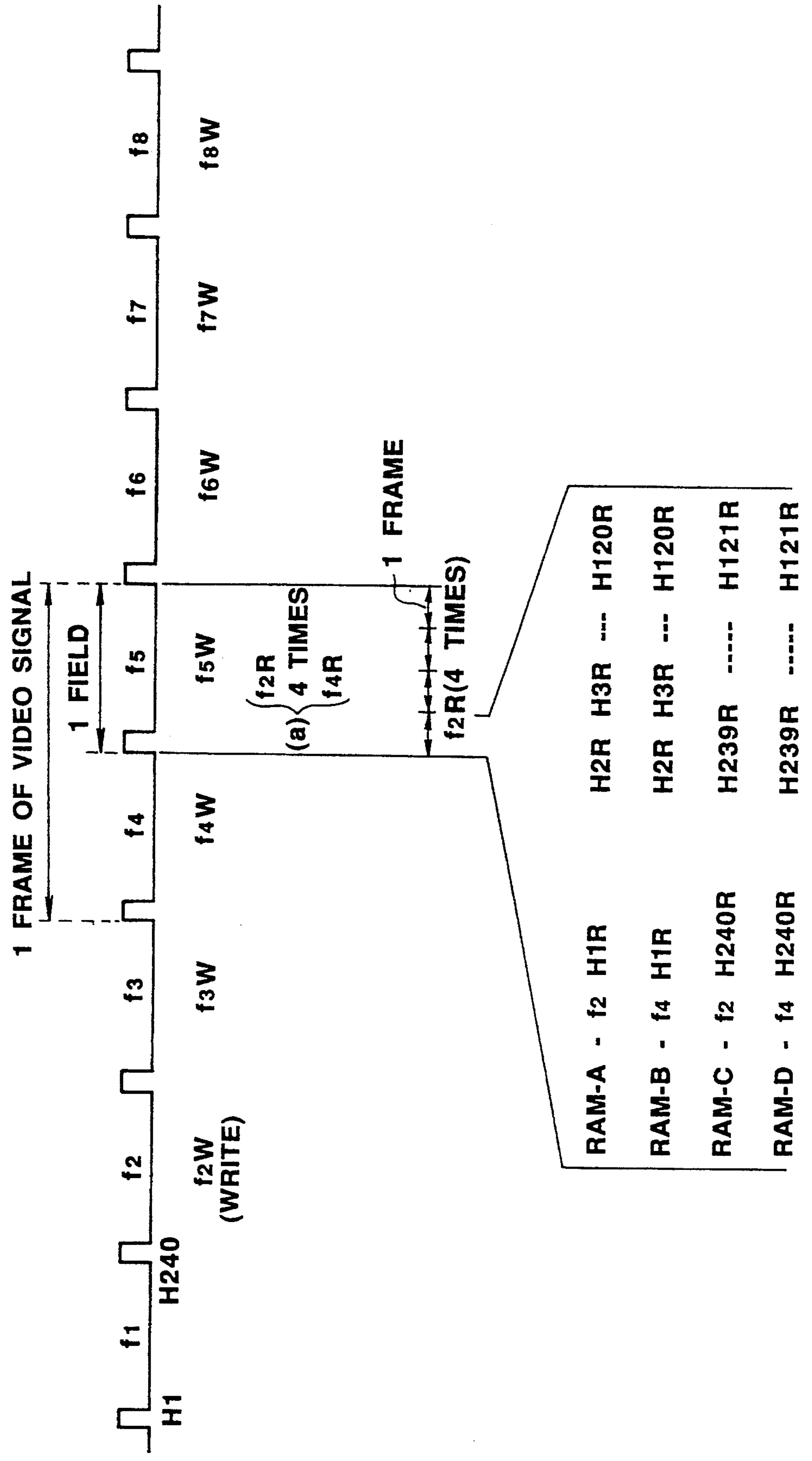
FIG. 12 is a waveform for explaining the operation of the image display apparatus.
Figures 13A, 13B, 13C, 13D, 13E, 13F, 13G, 13H, 13I, 13J:
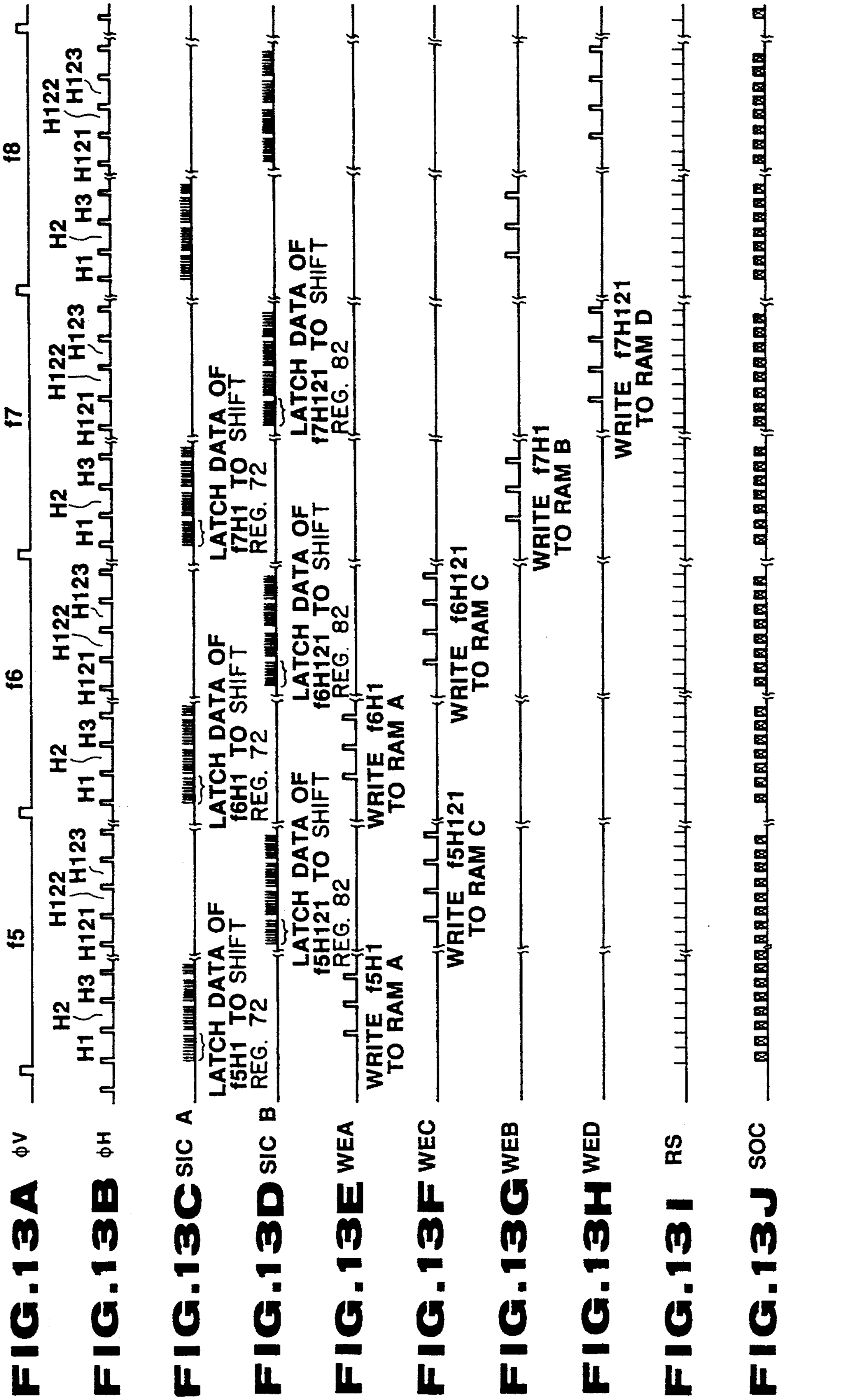
FIGS. 13A to 13J are waveforms for explaining the operations of the image display apparatus.
Figure 14:
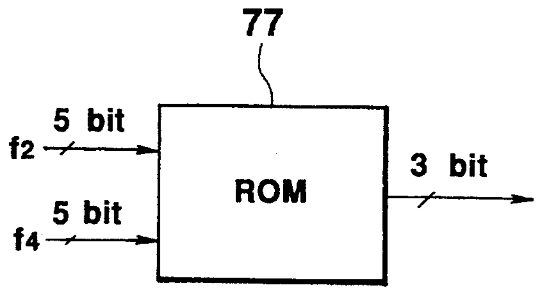
FIG. 14 is a diagram illustrating that a 5-bit gray scale signal is converted into a 3-bit signal.

FIG. 12 presents a diagram for explaining the operation to write and read video data to and from the RAM-A to RAM-D in, for example, f5, one of the fields f1 to f8. FIGS. 13A to show give a timing chart that illustrates the detailed operation timings of the individual sections in the fields f5 to fS.

In the first half of each field, the shift register 72 latches the data from the A/D converter 12 in response to the data shift clock SICA (FIG. 13C). In the second half of each field, the shift register 82 latches the data from the A/D converter 12 in response to the data shift clock SICB (FIG. 13D).

As shown in FIGS. 13E to 13H, first, in the first half of the field f5, data (H1 to H120) for the liquid crystal panel 20A is written line by line in the frame memory (RAM-A) 73 in response to the write enable signal WEA. In the second half of the field f5, data (H121 to H240) for the liquid crystal panel 20B is written line by line in the frame memory (RAM-C) 83 in response to the write enable signal WEC. Although there are 240 scan electrodes for each liquid crystal panel 20A or 20B, since the scan electrodes are selected by twos at a time, the data to be supplied in each field become H1 to H240 for 240 lines. There are 736 dots on one scan electrode, so that each piece of data Hi to H240 includes 736 pieces of gray scale data (5 bits each) which specify the gray scales of the associated dots.

In the field f6, data for the liquid crystal panel 20A is written in the frame memory (RAM-A) 73 in response to the write enable signal WEA, and data for the liquid crystal panel 20B in the frame memory (RAM-C) 83 in response to the write enable signal WEC.

In the next field f7, data for the liquid crystal panel 20A is written in the frame memory (RAM-B) 74 in response to the write enable signal WEB, and data for the liquid crystal panel 20B in the frame memory (RAM-D) in response to the write enable signal WED.

In the field f8 too, data for the liquid crystal panel 20A is written in the frame memory 74 in response to the write enable signal WEB, and data for the liquid crystal panel 20B in the frame memory 84 in response to the write enable signal WED.

In the subsequent field f9, data for the liquid crystal panel 20A is written in the frame memory 73 in response to the write enable signal WEA, and data for the liquid crystal panel 20B is written in the frame memory 83 in response to the write enable signal WEC.

The same operation will be repeated thereafter.

Video data for one line held in each shift register 72 or 82 is written line by line in the frame memories (RAM-A to RAM-D). More specifically, data of the field f2, for example, is written in the frame memories (f2W) at the timing of field f2, and data of the field f3 is written in the frame memories (f3W) at the timing of field f3, as shown in FIG. 12. Likewise, data of the field f8 is written in the frame memories (f8w) at the timing of field f8.

At the timing of the field f5, for example, data of the field f2 is read out from the frame memories four times (f2R). The contents of a single reading f2R are shown in the enlarged section in FIG. 12. It is apparent from this diagram that data H1 to H120 of the field f2 are read out from the frame memory (RAM-A) 73, and data H1 to H120 of the field f4 are read out from the frame memory (RAM-B) 74, while data H240 to H121 of the field f2 are read out from the frame memory (RAM-C) 83, and data H240 to H121 of the field f4 are read out from the frame memory (RAM-D) 84. Likewise, data for the upper half of the previous screen, data for the upper half of the current screen, data for the lower half of the previous screen and data for the lower half of the current screen are read out from the associated frame memories in other frames and other fields. The reason why data for the lower half of each screen is read out from the frame memory 83 or 84 in the reverse direction toward H121 from H240 will be explained later.

5-bit gray scale data for 736 dots for one horizontal scan is input to the shift register (SIM-A) 72, and 736-dot data stored in the shift register 72 is stored in the frame memories (RAM-A) 73 and (RAM-B) 74. 736×5-bit data are read out from the frame memories 73 and 74, and are output to the shift registers (SOM-A) 85 and (SOM-B) 86. The shift registers 85 and 86 store the 736×5-bit data read out from the frame memories 73 and 74 in response to the read pulse RS (FIG. 13I), and output the data dot by dot (in the units of five bits). The ROM 77 is accessed with the 5-bit data read out at the same timing from the shift registers 85 and 86, i.e., the 5-bit gray scale data for one frame and the previous frame with respect to the same dot. The ROM 77 is therefore accessed 736 times per one scan in the ½ horizontal scan period. Since the frame frequency is 240 Hz, the ROM 77 should normally be accessed 736 times in the ¼ horizontal scan period, but because of the provision of two display controllers 51 and 52, the ROM 77 is actually accessed 736 times in the ½ horizontal scan period. The same is true of the operation of the shift register (SOM-B) 86.

As the contents of the frame memory 73 are shifted by one frame (two fields) from the contents of the frame memory 74, the ROM 77 is accessed using the video data of, for example, the fifth field f5 and the seventh field f7 as addresses. Converted 3-bit data is read out from the ROM 77 when accessed by 5-bit data, and is output to the signal driver 23. This means that all of the drivers of the liquid crystal panel 20 operate on a 3-bit signal (see FIG. 14). Therefore, video data of the field f2 and data of the field f4 which specifies the gray scale of the same dot in the next frame are stored in the associated frame memories, and are compared with each other in the field f5. This presents a display delayed by a frame.

As described above referring to FIG. 14, since the liquid crystal driving systems to drive the liquid crystal panel 20 can all operate on 3-bit data, the circuit scale can be reduced significantly. In this case, all of the three systems for R, G and B can operate on 3-bit, and, what is more, 5-bit information can still be acquired while processing 3-bit data.

Operation of Liquid Crystal Driver

Figure 15:
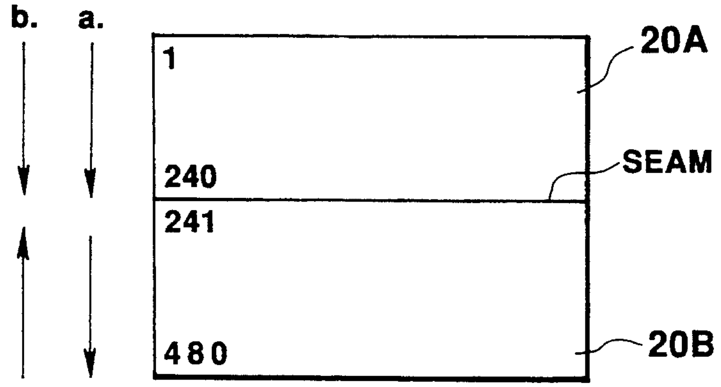
FIG. 15 is a waveform for explaining the operation of the liquid crystal display apparatus.

FIG. 15 is a diagram showing the drive waveforms output from the scan electrode drivers 21 and 22. In this embodiment, because the scan electrodes are driven by twos (feature (5); see FIG. 7), the line 2 (X2) and line 3 (X3), the line 4 (X4) and line 5 (X5), and so forth are selected simultaneously in the one field, and the line 3 (X3) and line 4 (X4), the line 5 (X5) and line 6 (X6), and so forth are selected simultaneously in the next field, the former combination of the selected lines being different from the latter combination, as shown in FIG. 15. This particular driving technique increases the driving margin of the liquid crystal.

Further, this embodiment employs a method of inverting the drive waveform every period for selection of the scan electrodes in order to drive the liquid crystal panel by an AC voltage.

Figure 16:
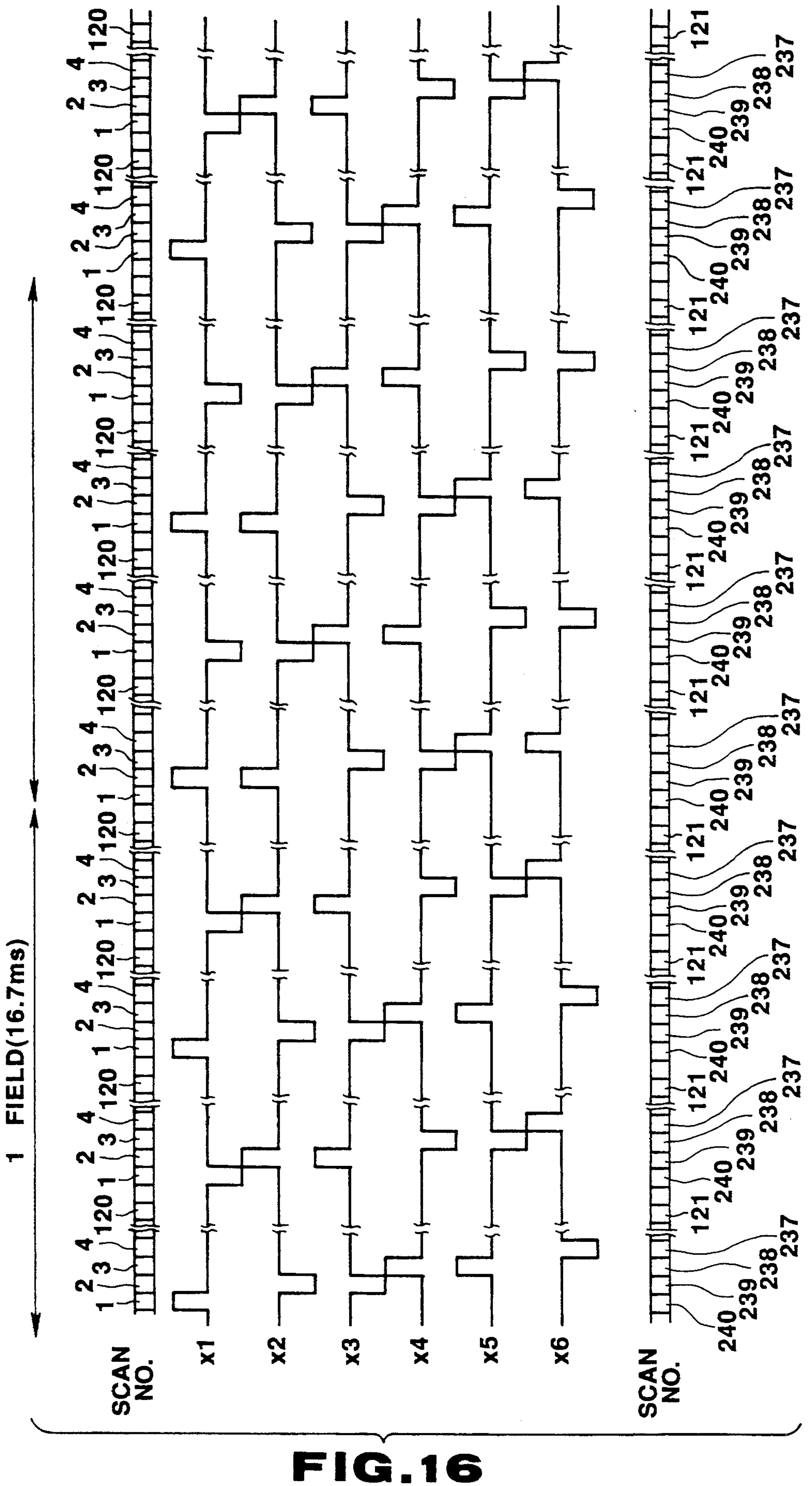
FIG. 16 is a diagram for explaining how scanning electrodes are driven in the image display apparatus.

Furthermore, in scanning the bisected liquid crystal panel 20 in this embodiment, both the upper liquid crystal panel 20A and the lower liquid crystal panel 20B are not scanned in the forward direction as indicated by the arrow a in FIG. 16, but the lower liquid crystal panel 20B is scanned in the reverse direction as indicated by the arrow b in FIG. 16. This driving can cause the seam between the upper and lower liquid crystal panels 20A and 20B not to stand out. In reading out data from the frame memories (RAM-C) 83 and (RAM-D) 84 of the display controller 52, therefore, data is read out in the reverse direction from H240 to H121 as shown in FIG. 12.

When the zero bias control signal EC is input to the voltage selectors 92 and 93 from the controller 69 (i.e., when the zero bias control signal EC becomes "1" for each frame period as shown in FIG. 17), the voltage selectors 92 and 93, which have been outputting the liquid crystal drive voltage V1 or V3 up to that point of time, will output the voltage V2. As a result, the signal electrode drivers 23 and 24 are supplied with the voltage V2, so that this voltage V2 is applied to the signal electrodes of the liquid crystal panel 20. As the voltage V2 (e.g., 0 volts) is generally supplied to the scan drivers in the non-selecting period, rendering the level of the zero bias control signal EC to "1" can set the voltages applied to the signal electrodes and scan electrodes to the voltage V2, ensuring the zero bias state.

As described above, the image display apparatus 2 according to this embodiment is provided with the controller 69, which prepares the zero bias control signal EC that becomes active in each field period, and the voltage selectors 92 and 93, which, upon reception of the zero bias control signal EC, switch the liquid crystal drive voltages V1 and V3 to the zero bias voltage V2 and output it, whereby the zero bias periods are distributed to the individual frames. It is therefore possible to increase the frame frequency to increase the operational margin, improving the contrast, without causing an adverse effect on display due to the increased frame frequency, which otherwise shortens a single scan time and thus increases the ratio of the zero bias periods in the individual frames, causing an adverse effect on the display.

The display controller 51 comprises the shift register (SIM-A) 72 for storing 5-bit video data for one scan line, the frame memory (RAM-A) 73 where the data for one scan line stored in the shift register 72 is written in response to the signal WEA, the frame memory (RAM-B) 74 where the data for one scan line stored in the shift register 72 is written at the timing of the signal WEB, the shift register (SOM-A) 75 for reading out the data for one line, written in the frame memory 73, at a time in response to the read pulse RS for temporary storage, the shift register (SOM-B) 76 for reading out the data for one line, written in the frame memory 74, at a time at the timing of the read pulse RS for temporary storage, and the ROM 77 which has the ROM table 100 stored therein, sequentially compares the data of the previous frame stored in the shift register 75 with that of the current frame stored in the shift register 76, and outputs data converted values, given in the ROM table 100, to the signal driver 55. The display data stored in the frame memories (RAM-A) 73, (RAM-B) 74, (RAM-C) 83 and (RAM-D) 84 are read out four times in one field in such a way that the display data stored in the frame memories 83 and 84 are read out therefrom in an order different from the writing order. It is therefore possible to increase the frame frequency and improve the contrast accordingly. In addition, the seam between the upper and lower liquid crystal panels 20A and 20B will not stand out, thus improving the image quality.

Although the reference voltage of the A/D converter 12 is shifted by a single frequency-dividing resistor (one range) for every field in this embodiment, this embodiment is not restricted to this particular shifting. For instance, the reference voltage may be shifted by three frequency-dividing resistors (three ranges); this modification may improve the image quality in some cases.

While the zero bias periods are distributed equally over the individual frames in this embodiment, the zero bias periods may not be provided evenly. For instance, the zero bias periods may be distributed as "5H," "5H," "5H" and "7.5H" over the four frames, or may be distributed as "5.5H," "5.5H," "5.5H" and "6H."

Although the non-display period is the zero bias period in this embodiment, a period for keeping the scan electrodes and the signal electrodes at the same potential may be provided in the display period in which the same image is to be displayed.

While this embodiment is an image display apparatus as applied to, for example, an STN type liquid crystal projector, this is not in any way restrictive. It is needless to say that this invention can apply to any type of apparatus which uses a memory.

Although one field is divided into four frames in this embodiment, it may be divided into a different number of frames.

Further, the number of control bits for the image display apparatus and the number of bits of data in the ROM table are not limited to those specified herein for this embodiment.

Furthermore, the circuitry constituting the image display apparatus, and the circuitry constituting the liquid crystal panel and the number of pixels of the liquid crystal panel, etc., and the types of the image display apparatus and the liquid crystal panel are not restricted to those of this embodiment specified herein.

Second embodiment

Figure 18:
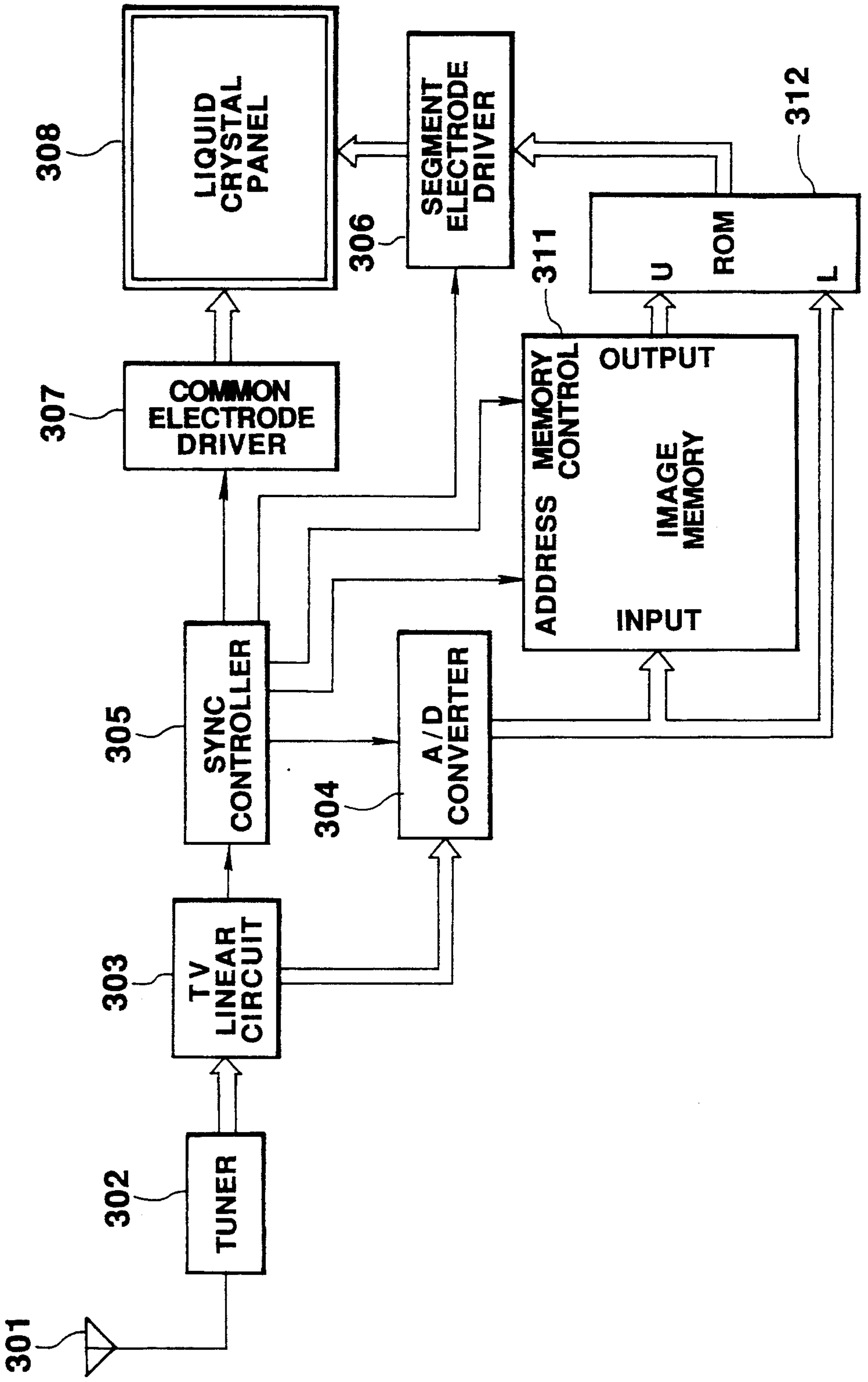
FIG. 18 is a block diagram illustrating the circuit structure of the second embodiment of the present invention.

FIG. 18 illustrates the second embodiment of the present invention as applied to a liquid crystal television. As shown in FIG. 19, an image memory 311 and a ROM 312 are provided on the output side of an A/D converter 304. The image memory 311, a dual port memory for storing image data in one frame, is operated in accordance with a memory address or a write/read command sent from a sync controller 305. The image memory 311 sequentially stores, for example, 3-bit image data sent from the A/D converter 304, and after reception of one-frame data, the memory 311 outputs the data to an upper-address terminal U of the ROM 312. Image data output from the A/D converter 304 is sent to a lower-address terminal L of the ROM 312. The ROM 312 has a table where the optimal image data is stored in advance which is acquired by the current image data and the image data for the previous frame to improve the response speed. The ROM 312 sends 3-bit image data D1 to D3 which are selected by the addresses supplied to the address terminals U and L, to a segment driver 306.

The operation of the second embodiment will now be explained.

FIG. 19 shows a table of image data stored in the ROM 312. 3-bit image data A2 to A0 directly input from the A/D converter 304 are regarded as lower addresses. 3-bit image data A5 to A3 which are input through the image memory 311 with a delay of one-frame period are regarded as upper addresses. One of pieces of image data "0" to "7" at the position on the table designed by those addresses is read out, and is sent as 3-bit image data D1 to D3 to the segment driver 306.

FIG. 20 exemplifies image data which is output from the A/D converter 304 at the timing of each of frame numbers "0" to "9" in accordance with the table shown in FIG. 19, and associated image data sent from the image memory 311 to the ROM 312. As shown in FIG. 20, if image data sent from the A/D converter 304 to the frame "0" has a gray scale "0," and image data sent to the frame "1" has a gray scale "4," a gray scale "0(000)" is input as the upper-addresses and a gray scale "4(100)" as the lower-addresses to the ROM 312 at the timing of the frame "1." A gray scale "6(110)" is therefore read out as image data D1 to D3 from the ROM 312 according to the table shown in FIG. 20, and it is then sent to the segment driver 306.

In the frame "2," a gray scale "4(100)" is input as the upper-addresses and a gray scale "7(111)" as the lower-addresses to the ROM 312. Consequently, a gray scale "7(111)" is likewise read out as image data D1 to D3 from the ROM 312, and is then sent to the segment driver 306.

For the other frames, the operation will be performed in the same manner. If the gray scale of image data sent from the A/D converter 304 is higher than that of image data in the previous frame sent from the image memory 311, image data having as lightly higher gray scale than the actually specified one is read out from the ROM 312, and is sent to the segment driver 306. When the gray scale of the image data from the A/D converter 304 is lower than that of the image data in the one previous frame which is output from the image memory 311, image data having a slightly lower gray scale than the actually specified one is read out from the ROM 312, and is sent to the segment driver 306. In the case where the gray scale of image data is changed, therefore, image data stored in advance in the ROM 312 is read out in accordance with the direction and the degree of change, and a liquid crystal panel 308 is then driven, yielding a sharp rise or fall in the light transmittance. It is therefore possible to increase the response speed of the liquid crystal panel 308 and permit the liquid crystal panel 308 to quickly follow up a drastically changing image.

The third embodiment

Figure 21:
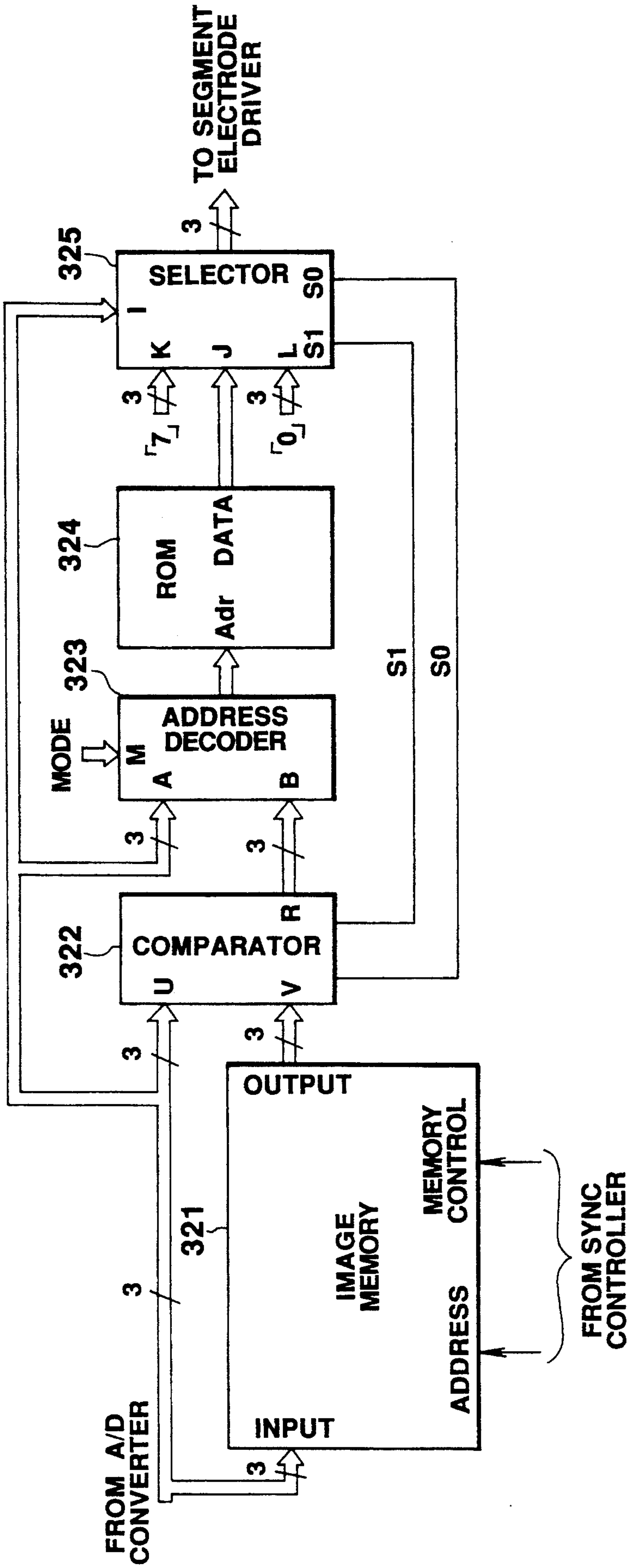
FIG. 21 is a block diagram illustrating a circuit structure according to the third embodiment of the present invention.

FIG. 21 illustrates the third embodiment of the present invention as applied to a liquid crystal television. As shown in FIG. 21, an image memory 321, a comparator 322, an address decoder 323, a ROM 324 and a selector 325 are provided on the output side of an A/D converter 304. The image memory 321, a dual port memory for storing image data in one frame, is operated in accordance with a memory address or a write/read command sent from a sync controller 305. The image memory 321 sequentially stores, for example, 3-bit image data sent from the A/D converter 304, and after reception of one-frame data, the image memory 321 outputs the data to an input terminal V of the comparator 322. Image data output from the A/D converter 304 is directly sent to an input terminal U of the comparator 322. The comparator 322 subtracts image data in the previous frame at the input terminal V from the current image data at the input terminal U. The comparator 322 then sends a gray scale difference signal as the result of the comparison from an output terminal R to an input terminal B of the address decoder 323, and sends identification signals S0 and S1 to the selector 325 according to the comparison result. The address decoder 323 receives image data directly from the A/D converter 304 at its input terminal A, and generates designation addresses corresponding to the signals given to the input terminals A and B by a mode signal from a control system (not shown), outputting those addresses from its output terminal Y to the address terminal of the ROM 324. Upon reception of the designation addresses from the address decoder 323, the ROM 324 reads image data previously stored, and outputs the image data to an input terminal J of the selector 325. In accordance with the identification signals SO and S1 from the comparator 322, the selector 325 selects image data directly input to an input terminal I from the A/D converter 304, image data "7" of the maximum gray scale input to an input terminal K, image data input to the input terminal J from the ROM 324, or image data of the minimum gray scale input to an input terminal L. The selected image data is output from an output terminal P of the selector 325 to the segment driver 306.

The operation of the third embodiment will be described below.

FIG. 22 illustrates output signals according to the comparison result from the comparator 322. If the current image data from the A/D converter 304 to be sent to the input terminal U is the maximum gray scale "7," the comparator 322 sets the identification signal S0 to the selector 325 to "0" (low level) and S1 to "1" (high level) regardless of the gray scale of the image data from the image memory 321 in the previous frame to be input to the input terminal V. Likewise, in the case where the current image data is the minimum gray scale "0," the comparator 322 sets both identification signals S0 and S1 to the selector 325 to "1" regardless of the image data in one previous frame.

When the current image data is not "7" or "0" and the result of the comparison of the gray scale of this image data with that of the image data of the previous frame is "(+)4" or greater, or "−4" or smaller, it means that the image data has been drastically changed. The comparator 322 does not output the gray scale signal to the address decoder 323 from the output terminal R but outputs only the identification signals S0 and S1 having values as shown in FIG. 22. Likewise, when the comparison result is "0," which indicates that the image data has not been changed at all, the comparator 322 outputs neither the gray scale difference signal to the address decoder 323 nor the identification signals S0 and S1 from the output terminal R.

If the comparison result is one of "(+)1' to "(+)3" or "−3" to "−1," which means that the image data has been changed in a specific range, the comparator 322 outputs the gray scale difference signal "U-V" to the address decoder 323 from the output terminal R, and also outputs the identification signals S0 and S1 having the values shown in FIG. 22 to the selector 325.

The address decoder 323 generates designation addresses in normal mode in accordance with image data from the A/D converter 304 directly input to the input terminal A, and the gray scale difference signal from the comparator 322 input to the input terminal B. The address decoder 323 then outputs those addresses from its output terminal Y to the address terminal of the ROM 324. The ROM 324 reads previously-stored image data according to the specified addresses from the address decoder 323, and outputs the image data to the input terminal J of the selector 325. FIG. 24 shows the correlation between the signals input to the input terminals A and B of the address decoder 323 and the image data read out from the ROM 324. As apparent from this diagram, stored in advance in the ROM 324 is only image data having gray scales with slightly greater emphasis put on the degree of change than the actual gray scales, which are necessary when the current image data has one of the values "1" to "6" and the value of the gray scale difference signal is in the range of "(+)1" to "(+)3," or "−3" to "−1," so that the image data is read out whenever specified.

In accordance with the identification signals S0 and S1 from the comparator 322, the selector 325 selects one piece of image data to be input from the input terminals I, J, K and L as shown in FIG. 23, and outputs the selected image data from the input terminal p to the segment driver 306. The contents selected by this selector 325 will be described below.

i) In the case of S0="0" and S1="0"

There is no change in the gray scale because the current image data from the A/D converter 304 and the image data of the previous frame have the same gray scale. The selector 325 outputs the current image data, directly sent from the A/D converter 304 to the input terminal I, from the output terminal P without any change.

ii) In the case of S0="0" and S1="1"

The gray scale difference signal "U-V" output from the output terminal R of the comparator 322 has one of the values "(+)1" to "(+)3," or "−3" to "−1." This means that the current image data has been changed from the image data of the previous frame in a specific range. The selector 325 outputs the image data shown in FIG. 25, which has been received at the input terminal J from the ROM 324 and has a gray scale with slightly greater emphasis put on the degree of change, from the output terminal P.

iii) In the case of S0="1" and S1="0"

In this case the current image data has the maximum gray scale "7" or the value of the gray scale difference signal "U-V" to be output from the output terminal R of the comparator 322 is "4" or greater. The selector 325 therefore outputs the maximum gray scale "7" of the image data, which has been received at the input terminal K, from the output terminal P.

iv) In the case of S0="1" and S1="1"

In this case, the current image data has the minimum gray scale "0" or the value of the gray scale difference signal "U-V" to be output from the output terminal R of the comparator 322 is "−4" or smaller. The selector 325 therefore outputs the minimum gray scale "0" of the image data, which has been received at the input terminal L, from the output terminal P.

As described above, image data having a gray scale with slightly greater emphasis on the degree of change and stored in advance in the ROM 324 is read out therefrom only when the current image data is different from the image data of the previous frame in a specific range. In the other cases, the current image data or image data indicating the maximum gray scale or the minimum gray scale is sent to the segment driver 306, in accordance with the contents of the image data and the degree of change from the image data of the previous frame. The amount of image data to be stored in advance in the ROM 324 can be reduced significantly, thereby decreasing the required memory capacity of the ROM 324.

With image data consisting of three bits, for example, when a table of image data is to be stored in advance in the ROM 324 to permit image data having a properly emphasized gray scale to be acquired simply from the current image data and the image data of the previous frame, the ROM 324 normally needs a memory capacity corresponding to 64 ($=8\times8$) addresses. With the use of the table given in FIG. 25, however, the ROM 324 requires a memory capacity corresponding to 36 ($=6\times6$) addresses to have the same advantage as given in the above case.

The above embodiments are applied to the STN type LCD device. This invention is not limited to this device. The invention can be applied to TN (Twisted Nematic) type, TFT (Thin Film Transistor) type, and TFD (Thin Film Diode) type LCD devices, for example.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An image display apparatus for supplying gray scale data according to a video signal to a liquid crystal device to present a gray-scaled display, and for scanning said liquid crystal panel N times where N is an integer equal to or greater than 2 during one field period of the video signal, the apparatus comprising:

gray scale data generating means for comparing a current video signal of a picture area with a previous corresponding video signal of the same picture area at a predetermined earlier period, and for producing a comparison result; and for generating gray scale data for N times in accordance with the comparison result; and drive means for driving said liquid crystal device with gray scales based on said gray scale data generated by said gray scale data generating means.

2. An image display apparatus according to claim 1, wherein said predetermined period is one frame period.

3. An image display apparatus according to claim 1, wherein said predetermined period is two field periods.

4. An image display apparatus according to claim 1, wherein said gray scale data generating means includes table means for, upon reception of the current video signal and the previous video signal, outputting gray scale data according to said current and previous video signals.

5. An image display apparatus according to claim 4, wherein said table means outputs gray scale data whose number of bits is less than that of the video signals.

6. An image display apparatus according to claim 4, wherein said table means outputs gray scale data N times with respect to a single input of the video signals.

7. An image display apparatus according to claim 1, further comprising a first memory means for storing the current video signal and a second memory means for storing the previous video signal, and wherein said gray scale data generating means receives a video signal output from said first memory means and a video signal output from said second memory means.

8. An image display apparatus according to claim 1, wherein said gray scale data generating means includes a gray scale memory having gray scale data stored in advance.

9. An image display apparatus according to claim 1, wherein said gray scale data generating means includes means for supplying gray scale data representing a gray scale greater than that of the current video signal when a result of comparison between the current video signal and the previous video signal indicates that the gray scale of the current video signal is greater than that of the previous video signal, and for supplying gray scale data representing a gray scale smaller than that of the current video signal of the current video signal is smaller than that of the previous video signal.

10. An image display apparatus according to claim 1, wherein a non-display period is provided in each of said N display periods during the one field period.

11. An image display apparatus according to claim 1, further comprising projecting means for projecting an image displayed on said liquid crystal device.

12. An image display apparatus according to claim 1, further comprising:

television receiving means for receiving a television signal, A/D converting means connected to said television receiving signal, for converting a video signal included in the received television signal into a digital video signal, and means for supplying the digital video signal to said gray scale data generating means.

* * * * *